(12) United States Patent
Aldrich

(10) Patent No.: US 7,720,662 B1
(45) Date of Patent: May 18, 2010

(54) VISUAL REPRESENTATION OF MODEL EXECUTION RESULTS CONTRIBUTING TO A FAILURE CONDITION IN A MODEL

(75) Inventor: William J. Aldrich, Belmont, MA (US)

(73) Assignee: The MathWorks, Inc., Natick, MA (US)

( * ) Notice: Subject to any disclaimer, the term of this patent is extended or adjusted under 35 U.S.C. 154(b) by 794 days.

(21) Appl. No.: 11/292,512

(22) Filed: Dec. 2, 2005

(51) Int. Cl.
*G06F 17/50* (2006.01)
*G06G 7/62* (2006.01)

(52) U.S. Cl. .................. 703/13; 715/273; 715/763; 345/589; 717/124

(58) Field of Classification Search ............ 703/2, 703/13
See application file for complete search history.

(56) References Cited

U.S. PATENT DOCUMENTS

| | | | | |
|---|---|---|---|---|
| 6,163,763 | A * | 12/2000 | Cox et al. ............. | 703/17 |
| 6,263,301 | B1 * | 7/2001 | Cox et al. ............. | 703/14 |
| 6,363,503 | B1 * | 3/2002 | Clauss et al. .......... | 714/57 |
| 6,862,030 | B1 * | 3/2005 | Bachmann ............ | 715/772 |
| 6,983,446 | B2 * | 1/2006 | Charisius et al. ...... | 717/113 |
| 7,263,674 | B2 * | 8/2007 | Lorenz ................ | 716/4 |
| 7,506,304 | B2 * | 3/2009 | Morrow et al. ........ | 717/109 |
| 7,542,980 | B2 * | 6/2009 | Tsyganskiy et al. .... | 707/101 |
| 2005/0257203 | A1 * | 11/2005 | Nattinger ............. | 717/154 |

OTHER PUBLICATIONS

The Mathworks, Inc, "Using Simulink, Version 4", Jun. 2001, pp. 1-2-1-3, 3-6, 4-22-4-24, 4-41-4-48, 4-51-4-53, 4-60, 4-88, 5-6-5-7, 5-27-5-29, 8-16, 8-17, 8-24-8-26, 11-4-11-9, 11-20-11-23.*

The Mathworks, Inc, "Stateflow and Stateflow Coder", User's Guide, Version 5, , Jan. 2003, pp. 1-1-1-7, 11-27-11-31, 12-1-12-10.*

Aldrich, William, "Using Model Coverage Analysis to Improve the Controls Development Process", AIAA Modeling and Simulation Technologies Conference and Exhibit, Aug. 5-9, 2002.*

Taha et al, "An Approach to Software Fault Localization and Revalidation based on Incremental Data Flow Analysis", Proceedings of the 13th Annual International Computer Software and Applications Conference, pp. 527-534, Sep. 20-22, 1989.*

Alur et al, "Hierarchical Modeling and Analysis of Embedded Systems", Proceedings of the IEEE, vol. 91, Issue 1, Jan. 2003, pp. 11-28.*

Stolte et al, "Visualizing Application Behavior on Superscalar Processors", 1999 IEEE Symposium on Information Visualization, San Francisco, CA, Oct. 24-29 1999.*

* cited by examiner

*Primary Examiner*—Paul L Rodriguez
*Assistant Examiner*—Mary C Jacob
(74) *Attorney, Agent, or Firm*—Lahive & Cockfield, LLP; Kevin J. Canning

(57) ABSTRACT

A tool that can be used in connection with a programming or modeling environment is disclosed. The tool can be incorporated into the programming or modeling environment or implemented separately from the programming or modeling environment. The tool receives the execution or simulation results data of the programs or models from the programming or modeling environment, and analyzes the data to provide information on the execution results of the programs or models to a user, such as a programmer and a designer. The information is provided to the user in such a manner that the user can perceive the execution results easily.

31 Claims, 19 Drawing Sheets

Sorted List: ← 128

0:0  Sine Wave 1
0:1  Sine Wave 2
0:2  Function-Call Generator
0:3  Function-Call Subsystem
0:4  Integrator
0:5  Gain (algebraic id 0#1)
0:6  Sum (algebraic variable for id 0#1)
0:7  Out1

*Fig. 6B*

VISUAL REPRESENTATION OF MODEL EXECUTION RESULTS CONTRIBUTING TO A FAILURE CONDITION IN A MODEL

FIELD OF THE INVENTION

The present invention relates to programming or modeling environments, in particular to methods, systems and mediums for providing a visual representation of model execution results that contribute to a failure condition in the model in the programming or modeling environments.

BACKGROUND OF THE INVENTION

Various classes of block diagram models describe computations that can be performed on application-specific computing hardware, such as a computer, microcontroller, FPGA, and custom hardware. Classes of such block diagram models may include time-based block diagrams such as those found within Simulink® from The MathWorks, Inc. of Natick, Mass., state-based and flow diagrams such as those found within Stateflow® from The MathWorks, Inc. of Natick, Mass., entity flow network diagrams such as SimEvents from The MathWorks, Inc. of Natick, Mass., and data-flow diagrams such as those found with LabView from National Instruments of Austin, Tex. A common characteristic among these various forms of block diagrams is that they define semantics on how to execute the diagram.

Historically, engineers and scientists have utilized time-based block diagram models in numerous scientific areas such as Feedback Control Theory and Signal Processing to study, design, debug, and refine dynamic systems. Dynamic systems, which are characterized by the fact that their behaviors change over time, are representative of many real-world systems. Time-based block diagram modeling has become particularly attractive over the last few years with the advent of software packages such as Simulink from The MathWorks, Inc. Such packages provide sophisticated software platforms with a rich suite of support tools that makes the analysis and design of dynamic systems efficient, methodical, and cost-effective.

The block diagrams are not exclusively used for representing time-based dynamic systems but also for other models of computation. For instance, flow-charts are block diagrams used to capture process flow and are not generally suitable for describing dynamic system behavior. Data flow block diagrams are block diagrams that describe a graphical programming paradigm where the availability of data (often thought of as tokens) is used to initiate the execution of blocks, where a block represents an operation and a line represents execution dependency describing the direction of data flowing between blocks.

After executing or simulating the block diagrams, information on the execution or simulation results of the block diagrams needs to be provided to the designer or programmer of the block diagrams. In particular, the designer or programmer can use the information on the execution results of the block diagrams to correct the undesirable or unintended behavior of the block diagrams. In the conventional block diagram environments, the designer or programmer analyses the information on the execution results of the block diagrams, and determines, for example, which portion of the block diagram contributes to the undesirable or unintended behavior of the block diagram. The analysis process, however, is time-consuming. Therefore, it is desired to provide a visual representation of execution results of the block diagrams to the designer or programmer so that the designer or programmer can perceive the execution results easily.

SUMMARY OF THE INVENTION

The present invention provides a tool that can be used in connection with a programming or modeling environment, such as a block diagram environment, in which text-based or graphical programs or models are simulated or executed. The tool can be incorporated into the programming or modeling environment or implemented separately from the programming or modeling environment. The tool receives the execution or simulation results data of the programs or models from the programming or modeling environment, and analyzes the data to provide information on the execution results of the programs or models to a user, such as a programmer and a designer. The user may use the information on the execution results of the programs or models to correct the undesirable or unintended behavior of the programs or models. The information is provided to the user in such a manner that the user can perceive the execution results easily.

The present invention may provide information on the counterexamples of the programs or models that contribute to a failure condition of the simulation or execution of the programs or models. The counterexamples of the graphical programs or models whose values at earlier sample times contribute to the failure condition can be displayed differently than the counterexamples of the programs or models whose values at the current sample time contribute to the failure condition of the simulation or execution. The present invention may also provide information on the sequence of states and transitions in the programs or models. The sequence of states and transitions may be displayed using, for example, shading increments. The present invention may also provide information on the characteristic of signals in the programs or models, such as logical signals and their values, and event signals and the propagation of the event signals.

In accordance with one aspect of the present invention, a method is provided for displaying information on execution results of a model. The method includes the step of analyzing execution results of a model to determine a portion of the model that contributes to a failure condition of the model. The method also includes the step of displaying the portion of the model differently than other portions of the model that do not contribute to the failure condition of the model.

In another aspect of the invention, a system is provided for displaying information on execution results of a model. The system includes an analysis unit for analyzing execution results of a model to determine a portion of the model that contributes to a failure condition of the model. The system also includes a display unit for displaying the portion of the model differently than other portions of the model that do not contribute to the failure condition of the model.

In another aspect of the invention, a medium is provided for holding instructions executed in a computer to display information on execution results of a model. The instructions are executed to analyze execution results of a model to determine a portion of the model that contributes to a failure condition of the model. The instructions are also executed to display the portion of the model differently than other portions of the model that do not contribute to the failure condition of the model.

BRIEF DESCRIPTION OF THE DRAWINGS

The aforementioned features and advantages, and other features and aspects of the present invention, will become better understood with regard to the following description and accompanying drawings, wherein:

FIG. 6B depicts a linear sorted list generated from the directed graph of FIG. 6A;

DETAILED DESCRIPTION

Figure 1:
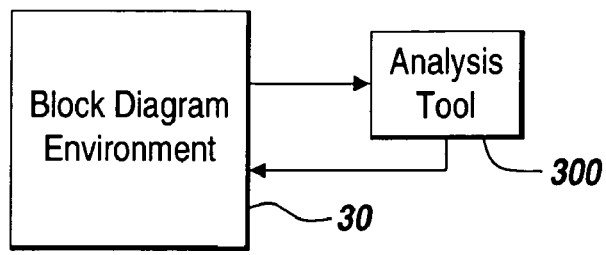
FIG. 1 shows an exemplary system suitable for practicing the illustrative embodiment of the present invention.

Certain embodiments of the present invention are described below. It is, however, expressly noted that the present invention is not limited to these embodiments, but rather the intent is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The illustrative embodiment of the present invention provides a tool for displaying information on the execution or simulation results of a program or model. The terms "program/programming" and "model/modeling" will be used interchangeably in the description of the illustrative embodiment. In the description of the illustrative embodiment, the simulation of the graphical program/model is also referred to as the execution of the program/model.

The illustrative embodiment will be described below solely for illustrative purposes relative to a time-based block diagram model. Although the illustrative embodiment will be described relative to the time-based block diagram model, one of skill in the art will appreciate that the present invention may apply to other programs or models, including state-based and flow diagrams, entity flow networks, data flow diagrams, event-based circuits, physics models, and Unified Modeling Language (UML) models.

The illustrative embodiment will be described below relative to a Simulink® model, a time-based block diagram found in Simulink® from The MathWorks, Inc. of Natick, Mass. Nevertheless, those of skill in the art will appreciate that the present invention may be practiced relative to models implemented in other modeling environments, including but not limited to LabVIEW from National Instruments Corporation of Austin, Tex., and Rational Rose from IBM of White Plains, N.Y.

The illustrative embodiment of the present invention provides a tool for displaying information on the execution results of block diagrams. The tool can be incorporated into the block diagram environment or implemented separately from the block diagram environment. The tool may receive the execution results data of the block diagram and analyzes the data to display information to a user, such as a programmer and a designer. The user can use the information to correct the undesirable or unintended behavior of the programs or models. In the illustrative embodiment, the information is provided to the user in such a manner that the user can perceive the execution results easily.

The information on the simulation or execution results of the block diagram may include information on the counterexamples that contribute to a failure condition of the execution of the block diagram. Because such an instance of a block diagram execution is typically not desired, the term counterexample is used. The counterexamples whose values at earlier sample times contribute to the failure condition can be displayed differently than the counterexamples whose values at the current sample time contribute to the failure condition of the simulation or execution. The information on the execution results of the block diagram may also include information on the sequence of the states and transitions in the block diagram. The sequence of the states and transitions may be displayed using shading increments. The information may include signal characteristics, such as logical signals and their values, and event signals and the propagation of the event signals.

FIG. 1 is an exemplary system suitable for practicing the illustrative embodiment of the present invention. The system 1 includes a block diagram environment 30 and an analysis tool 300 coupled to the block diagram environment 30. The block diagram environment 30 enables a user, such as a programmer and a designer, to build and/or execute a block diagram to simulate the behavior of the block diagram. The analysis tool 300 receives the execution data and analyzes the data to display to the user useful information on the block diagram. The designer or programmer can use the information on the execution results of the block diagram to correct the undesirable or unintended behavior of the block diagram. Although the analysis tool 300 is implemented separately from the block diagram environment 30 in the illustrative embodiment, one of ordinary skill in the art will appreciate that the analysis tool 300 can be incorporated into the block diagram environment 30.

One of ordinary skill in the art will also appreciate that the block diagram environment 30 and the analysis tool 300 may be provided on the same computing device, which will be described below in more detail with reference to FIG. 2A, or alternatively, the block diagram environment 30 and the analysis tool 300 may be coupled to each other via a communication network, which will be described below in more detail with reference to FIG. 2B.

Figure 2A:
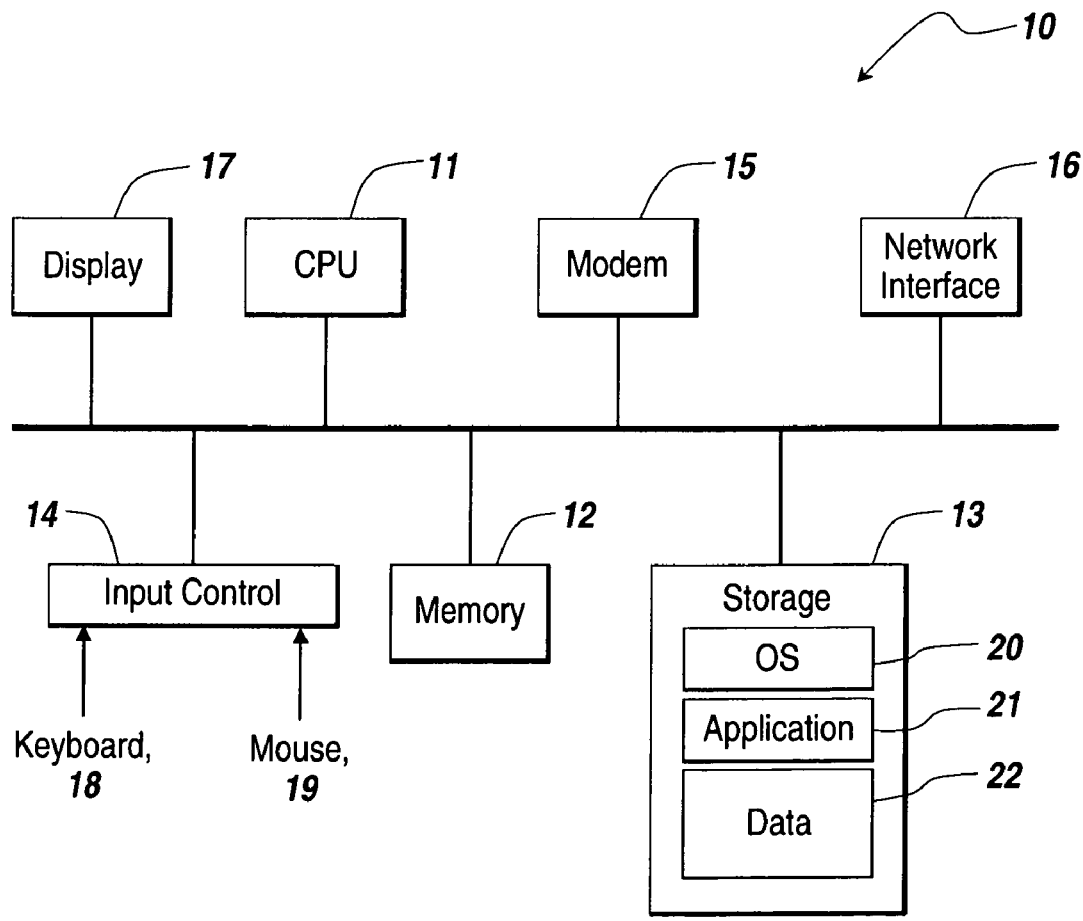
FIG. 2A shows an exemplary computing device suitable for practicing the illustrative embodiment of the present invention.

FIG. 2A is an exemplary computing device 10 suitable for practicing the illustrative embodiment of the present invention. One of ordinary skill in the art will appreciate that the computing device 10 is intended to be illustrative and not limiting of the present invention. The computing device 10 may take many forms, including but not limited to a workstation, server, network computer, quantum computer, optical computer, bio computer, Internet appliance, mobile device, a pager, a tablet computer, and the like.

The computing device 10 may be electronic and include a Central Processing Unit (CPU) 11, memory 12, storage 13, an input control 14, a modem 15, a network interface 16, a display 17, etc. The CPU 11 controls each component of the computing device 10 to provide the block diagram environment 30 and the analysis tool 300. The memory 12 temporarily stores instructions and data and provides them to the CPU 11 so that the CPU 11 operates the computing device 10 and runs the block diagram environment 30 and the analysis tool 300. The storage 13 usually contains software tools for applications. The storage 13 includes, in particular, code 20 for the operating system (OS) of the device 10, code 21 for applications running on the operation system including applications for providing the block diagram environment 30 and the analysis tool 300, and data 22 for block diagrams created in the block diagram environment 30 and the execution results of the block diagrams. Those of ordinary skill in the art will appreciate that the application can be stored in the memory 12 as well, much like the data, and even the OS, or they can be stored on the network described below with reference to FIG. 2B.

The input control 14 may interface with a keyboard 18, a mouse 19, and other input devices. The computing device 10 may receive through the input control 14 input data necessary for creating block diagrams, such as the selection of the attributes and operations of component blocks in the block diagrams. The computing device 10 may also receive through the input control 14 input data necessary for controlling the execution of the block diagrams. The computing device 10 may display in the display 17 user interfaces for the users to create or edit the block diagrams.

Optionally, the computing device 10 may include multiple CPUs for executing software loaded in the memory 12, and other programs for controlling system hardware. Each of the CPUs can be a single or multiple core processor. The code loaded in the memory 12 may run in a virtualized environment, such as in a Virtual Machine (VM). Multiple VM's may be resident on a single processor. Also, part of the application could be run in hardware, for example, by configuring a field programmable gate array (FPGA) or creating an application specific integrated circuit (ASIC).

Figure 2B:
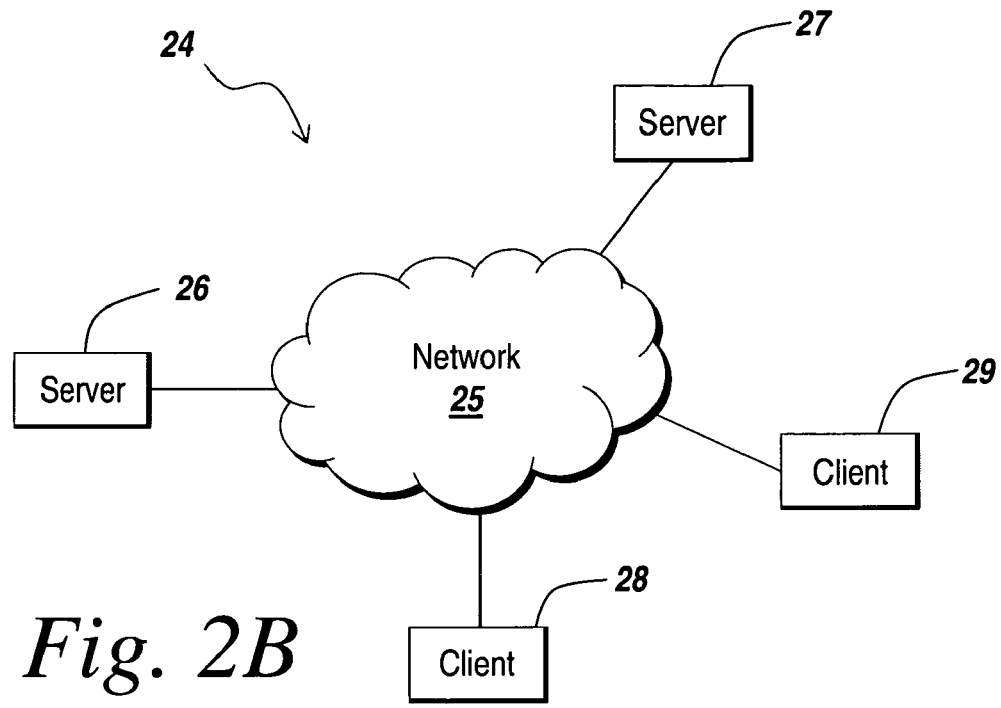
FIG. 2B shows an exemplary network environment suitable for practicing the illustrative embodiment of the present invention.

FIG. 2B is an exemplary network environment 24 suitable for the distributed implementation of the illustrative embodiment. The network environment 24 may include one or more servers 26 and 27 coupled to clients 28 and 29 via a communication network 25. The network interface 16 and the modem 15 of the computing device 10 enable the servers 26 and 27 to communicate with the clients 28 and 29 through the communication network 25. The communication network 25 may include Internet, intranet, LAN (Local Area Network), WAN (Wide Area Network), MAN (Metropolitan Area Network), wireless network (e.g., using IEEE 802.11 and Bluetooth), etc. The communication facilities can support the distributed implementations of the present invention.

In the network environment 24, the servers 26 and 27 may provide the clients 28 and 29 with software components or products under a particular condition, such as a license agreement. The software components or products may include those for providing a block diagram environment and a block diagram created in the block diagram environment. The software components or products may also include those for the analysis tool coupled to the block diagram environment. For example, the client 28 may build a block diagram using a software component provided by the server 26 and send the server 26 the bock diagram for the execution of the block diagram. The server 26 then returns execution results to the client 28 and the client 28 may subsequently analyze the execution results using the software component provided by the server 26 or another server 27.

The illustrative embodiment of the present invention will be described below in more detail with regard to the following sections, wherein the first section will describe the block diagram environment 30 and the second section will describe the analysis tool 300, respectively.

Block Diagram Environment

In practice, except for the most basic systems, mathematical models for dynamic systems involve a complex set of mathematical transformations applied in some prescribed manner with the outputs of some transformations forming the inputs of others. Each elemental transformation may be viewed in isolation as a simple dynamic system falling into one of the categories listed above. Therefore, a complex dynamic system may be modeled as an interconnection of various simple dynamic systems. A schematic representation of such an interconnection that has evolved over the years is the block diagram. Such block diagram models have now become a standard means in textbooks, design papers, journal articles, and specifications to communicate the details of a dynamic system's behavior.

A block diagram model of a dynamic system is represented schematically as a collection of blocks interconnected by lines that represent signals. A signal represents the input and output of a dynamic system. Each block represents an elemental dynamic system. A line emanating at one block and terminating at another signifies that the output of the first block is an input to the second block. Each distinct input or output on a block is referred to as a port. Signals correspond to the time-varying quantities represented by each line connection and are assumed to have values at each time instant. The source block of a signal writes to the signal at a given time instant when its system equations are solved. The destination blocks of this signal read from the signal when their system equations are being solved. The block diagram includes a plurality of blocks, lines and ports that are interconnected. Those skilled in the art will recognize that the term "blocks" does not refer exclusively to elemental dynamic systems but may also include other modeling elements that aid in readability and modularity of block diagrams.

Put another way, block diagram models are time-based relationships between signals and state variables representative of a dynamic system. The solution (computation of system response) of the model is obtained by evaluating these relationships over time. Signals represent quantities that change over time, and these quantities are defined for all points in time when evaluating the relationships. The relationships between signals and state variables are defined by sets of equations represented by blocks. These equations define a relationship between the input signals, output signals, state, and time. Inherent in the definition is the notion of parameters, which are the coefficients of the equations.

Inherent in the block diagram is the notion of system sample time. The sample-time is the time interval at which the inputs, state, or outputs (collectively referred to as the results) of the system are traced as time progresses. Based on sample times, a system can be described as a discrete-time system, continuous-time system and hybrid system.

A discrete-time system is a system in which the evolution of the system results is tracked at finite intervals of time. In the limit as the interval approaches zero, the discrete-time system becomes a continuous-time system. The intervals of time may be periodic or non-periodic. Sometimes, non-periodic rate systems are referred to as nonuniform-rate systems meaning that there is no periodic rate at which the response can be tracked. Nonuniform-rate systems can fall into the class of composite systems where an additional equation (GetTimeOfNextVarHit) defines when in the future the other equations associated with the system should be evaluated. A continuous-time system is a system in which the evolutions of the system results are continuously changing. Continuous-time signals change during numerical integration (minor time steps). An example of a continuous-time system is one described by an ODE. There can also be algebraic or composite continuous-time systems. A hybrid system is a system with both discrete-time and continuous-time elements.

If a system has only one sample time, it is said to be single-rate. If a system has multiple sample times, it is said to be multi-rate. Multi-rate systems can be evaluated (executed) using either a single-tasking form of execution or a multi-tasking form of execution. When multi-tasking execution is used, it conforms to rate monotonic scheduling principles as defined by Liu, C. L., and Layland, J. W. *Scheduling Algorithms for Multiprogramming in a Hard-Real-Time Environment*. ACM 20, 1 (January 1973), 46-61. Systems may also be categorized by the type of numerical integration solver being used. A fixed-step system is one that uses a fixed-step solver. Fixed-step solvers often use explicit methods to compute the next continuous state at fixed periodic intervals of time. A variable-step system is one that is using a variable-step solver. A variable-step solver can use either implicit or explicit methods to compute the next continuous state at non-periodic intervals of time. Generally, variable-step solvers use a form of error control to adjust the interval size such that the desired error tolerances are achieved.

Figure 3:
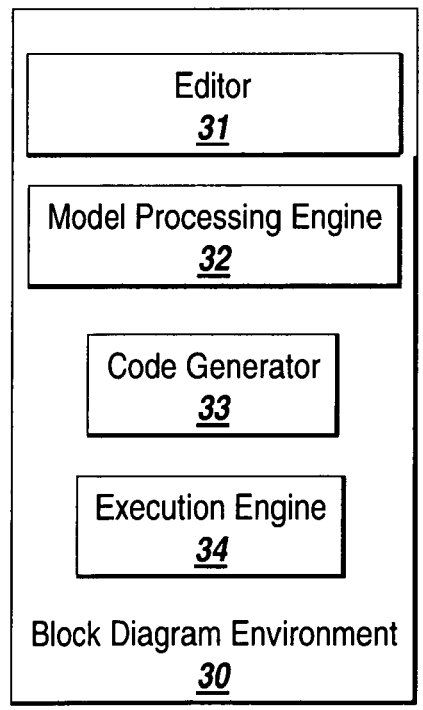
FIG. 3 depicts an exemplary block diagram environment provided in the illustrative embodiment of the present invention.

FIG. 3 depicts an exemplary block diagram environment 30 provided in the illustrative embodiment. The block diagram environment 30 may include an editor 31, a model processing engine 32, a code generator 33, and a model execution engine 34. An exemplary block diagram environment 30 can be provided by the software products, such as Simulink® from The Mathworks, Inc. of Natick, Mass., that cater to various aspects of dynamic system analysis and design. Such products allow users to perform various types of tasks including constructing system models through a user-interface that allows drafting block diagram models, allowing augmentation of a pre-defined set of blocks with custom user-specified blocks, the use of the block diagram model to compute and trace the temporal evolution of the dynamic system's outputs ("executing" the block diagram), and automatically producing either deployable software systems or descriptions of hardware systems that mimic the behavior of either the entire model or portions of it (referred to herein as "code generation"). Each of the tasks listed above has many intricate details and subtle variations which are explored further below. Although the discussion contained herein focuses on Simulink® from the MathWorks, Inc. of, Natick Mass., those skilled in the art will recognize that it is applicable to other block modeling software applications.

The block diagram editor 31 allows users to perform such actions as draw, edit, annotate, save, and print out block diagram representations of dynamic systems. As noted earlier, blocks are the fundamental mathematical elements of a classic block diagram model. Simulink® extends the classic block diagram models by introducing the notion of two classes of blocks, non-virtual blocks and virtual blocks. Non-virtual blocks are elementary dynamic systems. A virtual block is provided for graphical organizational convenience and plays no role in the definition of the system of equations described by the block diagram model. Examples of virtual blocks are the Bus Creator virtual block and Bus Selector virtual block which are used to reduce block diagram clutter by managing groups of signals as a "bundle". Virtual blocks may be used to improve the readability of models. Simulink® further extends the meaning of a non-virtual block to include other semantics, such as a "merge" block semantic. The merge block semantic is such that on a given time step its output is equal to the last block to write to an input of the merge block. An additional extension provided by Simulink® is the concept of conditional execution. Simulink® contains the concept of conditional and iterative subsystems that control when in time block methods execute for a sub-section of the overall block diagram.

A processing engine 32 carries out the task of compiling the block diagram to produce an "in-memory executable" version of the model that is used for generating code and/or simulating or linearizing a block diagram model. Note that execution of the block-diagram is also referred to as simulation. The compile stage involves checking the integrity and validity of the block interconnections in the block diagram. In this stage, the engine 32 also sorts the blocks in the block diagram into hierarchical lists that are used when creating the block method execution lists. In the link stage, the processing engine 32 uses the result of the compiled stage to allocate memory needed for the execution of the various components of the block diagram. The linking stage also produces block method execution lists that are used by the simulation, trimming or linearization of the block diagram. Included within the link stage is the initialization of the model which consists of evaluating "setup" methods (e.g. Block Start, Block Initialize, Enable, and ConstantOutput methods). The block method execution lists are generated because the simulation, trimming, and/or linearization of a model must execute block methods by type (not by block) when they have a sample hit.

For linearization, Simulink® uses the block method execution lists in a prescribed fashion to produce a linear state space representation of the dynamic system described by the block diagram.

After linking has been performed, the code generator 33 may generate code. In this stage, the code generator 33 may choose to translate the block diagram model (or portions of it) into either software modules or hardware descriptions (broadly termed code). If this stage is performed, then the stages that follow use the generated code during the execution of the block diagram. If this stage is skipped completely, then the execution engine 34 uses an interpretive mode of execution for the block diagram. In some cases, the user may not proceed further with the execution of the block diagram because they would like to deploy the code outside the confines of the block diagram software. Upon reaching the simulation stage, the execution engine 34 uses a simulation loop to execute block methods in a pre-defined ordering upon a sample hit to produce the system responses as they change with time.

Figure 4:
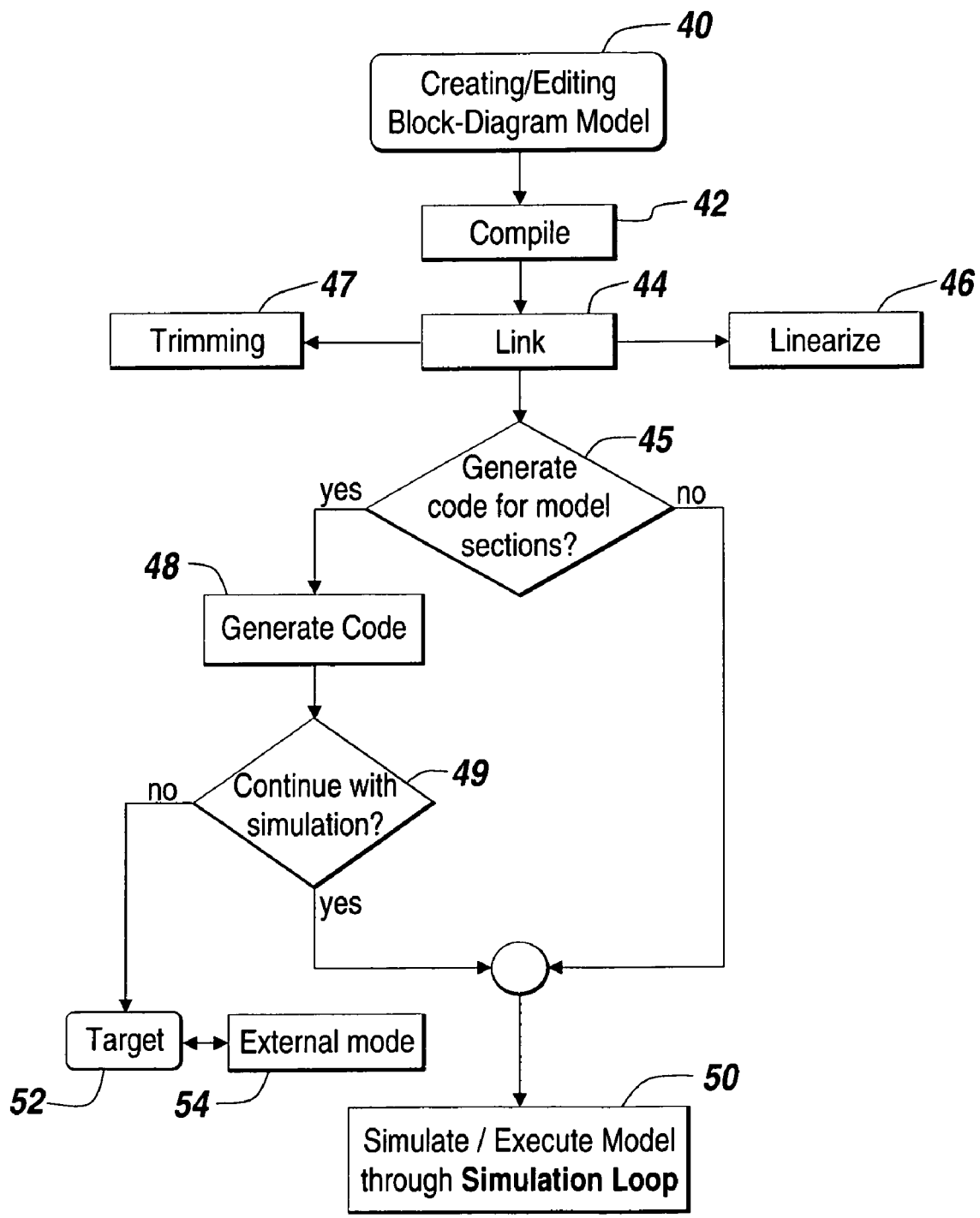
FIG. 4 is a flow chart of the sequence of steps used to perform simulation of the block diagram.

The interrelationship between the various stages is illustrated in a flowchart in FIG. 4. The execution begins when the block diagram is created/edited (step 40) and compiled (step 42). Following the compilation stage, is the model link stage (step 44) which may also produce linear models (step 46), or trim the block diagram model to find a trim point of a dynamic system of the block diagram model (step 47). Code may or may not be generated (step 45). If code is generated (step 48), a decision is made (step 49) whether to continue the simulation. If the decision is made to continue the simulation the model is simulated/executed through the Simulation Loop (step 50). If the simulation is not continued, the code may be delivered to a target (step 52) and executed in an external mode (step 54). If code is not generated the block diagram may execute in interpretive mode when entering the Simulation Loop (step 50).

The block diagram editor 31 is the graphical user interface (GUI) component that allows drafting of block diagram models by a user. In Simulink®, there is also a textual interface with a set of commands that allow interaction with the graphical editor 31. Using this textual interface, users may write special scripts that perform automatic editing operations on the block diagram. A user generally interacts with a set of windows that act as canvases for the model. There is generally more than one window for a model because models may be partitioned into multiple hierarchical levels through the use of subsystems (discussed further below).

A suite of GUI tools in Simulink® allows users to draft a block diagram model on the corresponding windows. The GUI tools include a block palette, wiring line connection tool, annotation tool, formatting tool, attribute editing tool, save/load tool and publishing tool. The block palette is a library of all the pre-defined blocks available to the user when they are building the block diagram. Individual users may be able to customize this palette to: (a) reorganize blocks in some custom format, (b) delete blocks they do not use, and (c) add custom blocks they have designed. The palette allows blocks to be dragged through some human-machine interface (such as a mouse or keyboard) from the palette on to the window (i.e., model canvas). The graphical version of the block that is rendered on the canvas is called the icon for the block. There may be different embodiments for the block palette including a tree-based browser view of all of the blocks.

The wiring line connection tool allows users to draw directed lines that connect the ports of blocks in the model's window. Lines are also added through various mechanisms involving human-machine interfaces such as the mouse or keyboard. Simulink® also provides various forms of auto-connection tools that connect blocks automatically on user request to produce an aesthetically pleasing layout of the block diagram (especially those with high complexity with large numbers of blocks). The annotation tool allows users to add notes and annotations to various parts of the palette for a block diagram. The formatting tool enables users to perform various formatting operations that are generally available on any document editing tool. These operations help pick and modify the various graphical attributes of the block diagram (and constituent blocks) such as include font-selection, alignment & justification, color selection, etc. The block diagram and all the blocks within the block diagram generally have a set of functional attributes that are relevant for the execution or code-generation. The attribute editing tool provides GUIs that allows these attributes to be specified and edited. The save/load tool allows a created block diagram model to be saved. The saved model can be reopened in the editor 31 at some later juncture through a load mechanism. Simulink® also allows users to save blocks including pre-constructed subsystems into a separate class of block-diagrams called libraries. Such libraries facilitate reuse of the same block in a number of other block-diagrams. The load/save mechanism is especially equipped to handle loading and saving of blocks in a block-diagram that actually reside in libraries.

The publishing tool enables the viewing of the block diagram as a document that can be published in any of the standard document formats (examples: PostScript, PDF, HTML, etc.). Those skilled in the art will recognize that the windows for multiple models and all of the tools mentioned above could potentially be embedded in a single Multi-Document Interface (MDI) for providing a unified software environment. Those skilled in the art will also recognize that block-diagram packages offer scripting languages for writing out programs that automatically carry out a series of operations that would normally require interaction with the GUI. For example, Simulink® offers a set of commands in MATLAB for carrying out operations such as block addition (add_block), block deletion (delete_block), starting and terminating execution (set_param), modifying block attributes (set_param/get_param), etc.

Simulink® also offers a variety of other GUI tools that improve the ability of users to build and manage large block diagrams. Examples of such GUIs include: (a) a Finder that helps find various objects such as blocks and lines within a block-diagram, (b) a Debugger that helps debug the execution of block-diagrams, (c) a Revision Control UI for managing multiple revisions of the block-diagram, and (d) a Profiler for viewing timing results while executing a block-diagram.

A typical base data-structure for a block may be represented as:

```
class Block {
    public:
        // Access methods for setting/getting block data
        ...
        // Methods for block editing
        virtual ErrorStatus BlockDrawIcon( );
        virtual BlockParameterData BlockGetParameterData( );
        ...
        // Methods for block compilation
        ...
        // Methods for block execution
        ............................................
        virtual ErrorStatus BlockOutput( )    = 0;
        virtual ErrorStatus BlockDerivative( ) = 0;
        virtual ErrorStatus BlockUpdate( )    = 0;
        ...
    private:
        BlockGraphicalData blkGraphicalAttributes;
        BlockFunctionalData blkFunctionalAttributes;
        BlockCompiledData blkCompiledAttributes;
        BlockExecutionData blkExecutionData;
        ...
};
```

Although the example of the data structure above is written in C++, those skilled in the art will recognize that equivalent data structures written in other languages may also be used. The major data fields of the block data structure fall into four categories including a graphical attributes field, a functional attributes field, a compiled attributes field and an execution data field.

The graphical attributes field is responsible for storing information relevant for graphical rendering of the block within its parent block diagram's GUI. Attributes specific to the block icon such as font, color, name, and icon-image are stored in this field. It should be noted that modifying these attributes does not affect the dynamics of the model using this block. The functional attributes field is responsible for specifying block attributes that may potentially affect the dynamics of the model using this block. These attributes are specified for the block as a whole and the input and output ports of the block. Examples of block attributes include block sample times and restrictive flags. Block sample times specify if the block corresponds to an elemental, continuous, discrete, or hybrid dynamic system. If the block is an elemental discrete-time system, then the attribute specifies the spacing between time instants at which the block response should be traced. A restrictive flag disallows the use of blocks in certain modeling contexts. For example, one may impose the restriction that there may only be one instance of a given block in a model.

Attributes of block ports specify properties of the data that is either available or produced at that port. Block port attributes include dimensions, data types, complexity, sample rates, and direct feed through. Dimension attributes are individual dimensions of a multi-dimensional matrix that is used as a container for data elements. Data type attributes are the data type of each element of data in the data container. A complexity attribute is a flag to specify if each data element is real or complex. A sample rate attribute specifies when the signal corresponding to an input or output port will be used. The port sample times may sometimes be used to implicitly infer the block's sample time. The direct feed through attribute is specified only for input ports and indicates whether or not the Output and/or GetTimeOfNextHit equations of the block are a function of the given input. This attribute helps in determining the sequence in which block methods should be executed while executing the block diagram.

The compiled attributes field of the block data structure holds the attributes of the block and its ports that mirror the functional attributes listed above. This field is filled in during block diagram compilation by utilizing the functional attributes of the block in conjunction with the functional and compiled attributes of the blocks that are connected to it. This process of determining the compiled attributes from the functional attributes is termed attribute propagation. Attribute propagation is described in greater detail below in connection with block diagram compilation. The execution data field is mainly responsible for storing the memory locations that are going to serve as sources for block inputs, outputs, states, parameters, and other work areas during execution of blocks.

The block data structure also has a set of associated methods that may be categorized as access methods to data fields, methods used in editing, methods used in compilation and methods used in execution. Access methods to data fields help in setting and getting the various data fields of the block. Methods used in editing are called by the block diagram editor 31 in order to render the block appropriately in the GUI of its parent block diagram. For instance, this set of methods may include a BlockDrawIcon method that determines the shape the block icon has on the GUI. Methods used in compilation are methods that are called by the block diagram compilation engine. They help validate the connections of the block to other blocks on the block diagram. The methods used in execution include a number of different run-time methods that are required for execution. These include the BlockOutput, BlockUpdate, BlockDerivative methods that realize the Output, Update, and Derivative equations discussed earlier in the context of dynamic systems. In addition to these methods, Simulink® includes several other run-time methods, such as the Jacobian, Projection, ZeroCrossings, Enable, Disable, Initialize, EvalParams (check and process parameters), and GetTimeOfNextHit methods. The Initialize method is called when a block is reset, e.g. a block is inside an enabled system configured to reset states and this function is called when the subsystem becomes enabled. It should be noted that there is no explicit method for algebraic equations because these are represented and processed in a different manner which will be discussed below.

The base data structure for the block specifies the generic fields and interfaces that need to be supported by a block. Some of the methods are purely virtual and have no specific implementation in the base block class. In order to define a specific block (such as an Integrator block), one needs to subclass the base block class and provide explicit definitions for these virtual methods. An example of the subclassing of a block may be seen by examining an Integrator block. In order to create the subclass, four major categories of information within the subclass must be specified, the block parameters, the methods used in editing, the methods used in compilation, and the methods used in execution. The elemental dynamic system embodied by the block may be parameterized as illustrated in the Background of the Invention. Each block needs to be able to specify its list of expected parameters. The block diagram editor's Attribute-Editing tool may allow users to specify the parameters for the block when they use it in their models. In the Integrator block example, the block has one parameter that specifies the block's initial condition for the block's state. Regarding the methods used in editing, the subclass needs to specify a method that renders its icon. For example, the Integrator block may implement a method that makes its icon be a box with a '1/s' within the box. Also, the subclass needs to instantiate a method that allows access of the block parameters from the GUI's Attribute-Editing tool. For the Integrator example, this method would allow users to specify the Initial Condition parameter on a GUI for the block. For the methods used in compilation, the subclass needs to instantiate methods that help in the compilation of the block diagram model in which it is placed. These methods help specify the compiled information for the inputs and outputs of the block. For instance, the Integrator block may specify a method that ensures that if the input to the Integrator is a vector, then the output is a vector of the same size. For methods used in execution, the subclass needs to instantiate specific Output, Derivative, and Update methods that represent the block behavior. In the case of the Integrator block, an Output and Derivative method are needed. It should be noted that in Simulink® the Integrator block has additional parameters and methods that are not illustrated here. The Output method sets the output to be equal to the state. The Derivative method sets the derivative of the state to be equal to the input.

The specification of these four types of information for the Integrator block subclass may be shown by a reduced form of the Simulink® Integrator block:

```
IntegratorBlock : public Block {
public:
    ErrorStatus BlockDrawIcon( ) {
        // Draw '1/s' on the icon
        ............................
    }
    BlockParameterData BlockGetParameterData( ) {
        // Return initial_condition as block data
        ............................
    }
    ErrorStatus BlockOutput( ){
        // Implement y(t) = x(t)
        ............................
    }
    ErrorStatus BlockDerivative( ){
        // Implement dx(t)/dt = u(t)
        ............................
    }
private:
    double initial_condition;
};
```

It should be noted that block diagram software generally provides open access to the block's data structure to users of the software. This allows users to create and utilize custom block implementations in their models.

Blocks in a block diagram may be virtual or non-virtual. The designation of a block as non-virtual indicates that it influences the equations in the mathematical model for the dynamic system. In the context of block diagram software, it is beneficial to include other virtual blocks that do not affect the equations in the dynamic system's model. Such blocks help improve the readability and modularity of the block diagram and wield no semantic influence on the mathematical model. Examples of such virtual blocks include virtual subsystems, inport blocks and outport blocks, bus creator blocks, bus selector blocks and From and Goto blocks.

Modularity may be achieved in a block diagram by layering the block diagram through the use of subsystems. A subsystem facilitates layering by allowing a collection of blocks to be represented by a single block, the subsystem, with input and output signals. The input and output signals of the subsystem are accessible to the constituent blocks within the subsystem. A subsystem is a virtual subsystem if its constituent blocks are moved back into the main block diagram model during the model's execution. Within a virtual subsystem graphical entities, called inport and outport blocks, are provided to define signal connections to the parent block diagram. These inport and outport blocks indicate a tunnel-through signal connection to the parent block diagram.

Simulink® also provides the user with the ability to extend the simulator by providing the ability to enhance the simulator with blocks that define dynamic systems or are virtual properties. The extension is provided through a language independent API (e.g. C, C++, Ada, Fortran, Assembly, M).

As noted previously, to facilitate modeling fairly large and complex dynamic systems, Simulink® allows users to layer their block diagrams. A subsystem facilitates such layering by allowing a collection of blocks to be represented by a single block, a subsystem, with input and output signals. The input and output signals of the subsystem are accessible to its constituent blocks. By nesting subsystems within each other, one can create block diagrams with arbitrary layers of hierarchy. Ideally a subsystem has no impact on the meaning of the block diagram. Additionally, subsystems provide a way of grouping blocks together and allowing other block diagram constructs to impose unified control on the constituent blocks. To enhance the modularity of subsystems, modeling software also allows aggregated list(s) of parameters of the blocks within the subsystem to be accessed from a single GUI, and defines and displays special icons on the subsystems. The process of defining the parameter list and the special icon is called masking a subsystem.

There are two main types of subsystem blocks, virtual subsystems and non-virtual subsystems. Virtual subsystems serve the purpose of providing the block diagram with a graphical hierarchy. Non-virtual subsystems behave like an elemental dynamic system with its own execution methods (Output, Update, Derivatives, etc.). These execution methods in turn call the execution methods of the constituent blocks.

The classes of non-virtual subsystems are:

Atomic subsystems. These are similar to virtual subsystems, with the advantage of grouping functional aspects of models at a given layer. This is useful in modular design.

Conditionally-executed subsystems. These are non-virtual subsystems that execute only when a precondition is fulfilled:

Enabled subsystems. These are similar to Atomic subsystems, except that the constituent blocks only execute when an enable signal feeding the subsystem is greater than zero.

Triggered subsystems. These are similar to Atomic subsystems, except that the constituent blocks only execute when a rising and/or falling signal is seen on a triggering signal feeding the subsystem.

Enable with Trigger subsystems. These are an intersection of the properties of Enabled and Triggered subsystems.

Action subsystems. These subsystems are connected to an action-initiator (e.g., an "If" or "SwitchCase" block), a block that explicitly commands the subsystem contents to execute. These subsystems are similar to Enabled subsystems except that the management of the "enabling" signal has been delegated to an action-initiator. Action subsystems define a new type of signal, called an action signal that signifies which subsystems are commanded to execute by the action-initiator.

Function-call subsystems. These subsystems provide a means of collecting blocks into a subsystem that is only executed when called by an owner block. The owner block may compute input signals for the subsystem before calling the subsystem. Additionally, the owner may also read output signals from the subsystem after calling it. Function-call subsystems define a new type of execution control signal, called a function-call signal that contains no data. It is used to define the execution relationship between the owner block and the function-call subsystem. Function-call owners may also designate themselves as an "interrupt" source. In simulation, they simulate the effects of an interrupt and in code generation they can attach themselves to an (asynchronous) interrupt.

While subsystems and For subsystems. These subsystems may execute the constituent blocks multiple times on a given time step.

Simulink® allows for several forms of block parameters to be defined. There are two general categories of parameters: those parameters that can be modified during simulation and those that cannot be modified. An example of a parameter that may be modified during simulation is the multiplication factor of a Gain block if configured by the user to allow modification during execution. A parameter such as the multiplication factor specifies coefficients of the dynamic equation, in this case the multiplication factor of the gain function defined by the Gain block. An example of a parameter that can never be modified during simulation is the sample time of the Gain block. The parameters that can be modified during simulation are further broken down into other categories which include mapping the dialog parameter (e.g. the amplitude) to run-time parameters or converting the dialog parameter to an inlined (non-modifiable) parameter. Run-time parameters can further be mapped to mathematical expressions of tunable MATLAB variables or MATLAB parameter objects describing properties of the variables (called Simulink.Parameter). A global run-time parameter data structure is used within Simulink® to manage the block parameters during the execution of the model.

In addition to block parameters, there are model-wide parameters that are generally associated with the solver. These parameters include aspects such as the time span in which to perform a simulation and the type of solver. Simulink® gives the user the ability to adjust solver parameters during model execution. The adjustment of these solver parameters is performed at the start of a time step.

Once a block diagram model has been constructed using the editor 31, the model is solved in order to trace the system outputs as a function of time. The solution of the model, which may be referred to as model execution, is carried out from a user-specified input time for a set of user-specified inputs. Simulation proceeds in four major stages: compilation, link, code generation, and the simulation loop. Alternatively, a linear representation of the model can be obtained (linearization) or the model can be trimmed to find a trim point of a dynamic system. A trim point, also known as an equilibrium point, is a point in the parameter space of a dynamic system at which the system is in a steady state. For example, a trim point of an aircraft is a setting of its controls that cause the aircraft to fly straight and level. Mathematically, a trim point is a point where the system's state derivatives equal zero. Trimming starts from an initial point and searches, using a sequential quadratic programming algorithm, until it finds the nearest trim point. A user can supply the initial point implicitly or explicitly. Trimming can find trim points that meet specific input, output, or state conditions, and it can find points where a system is changing in a specified manner, that is, points where the system's state derivatives equal specific nonzero values.

The compile stage marks the start of model execution and involves preparing data structures and evaluating parameters, configuring and propagating block characteristics, determining block connectivity, and performing block reduction and block insertion. The preparation of data structures and the evaluation of parameters create and initialize basic data-structures needed in the compile stage. For each of the blocks, a method forces the block to evaluate all of its parameters. This method is called for all blocks in the block diagram. If there are any unresolved parameters, execution errors are thrown at this point.

During the configuration and propagation of block and port/signal characteristics, the compiled attributes (such as dimensions, data types, complexity, or sample time) of each block (and/or ports) are setup on the basis of the corresponding functional attributes and the attributes of blocks (and/or ports) that are connected to the given block through lines or based on model attributes such as the solver step size. The attribute setup is performed through a process during which block functional attributes "ripple through" the block diagram from one block to the next following signal connectivity. This process (referred to herein as "propagation"), serves two purposes. In the case of a block that has explicitly specified its block (or its ports') functional attributes, propagation helps ensure that the attributes of this block are compatible with the attributes of the blocks connected to it. If not, an error is issued. For instance, if an Integrator block is implemented to only accept numbers of double precision data type, then this block will error out if it is driven by a block that produces single precision data, unless the user has asked for an implicit data conversion. Secondly, in many cases blocks are implemented to be compatible with a wide range of attributes. Such blocks adapt their behavior in accordance with the attributes of the blocks connected to them. This is akin to the concept of polymorphism in object-oriented programming languages. For instance, a discrete-time Filter block could be implemented to accept any of the standard integer data types ranging from 8-bit to 128-bit. The exact implementation of the block is chosen on the basis of the specific block diagram in which this block finds itself. Included within this step are other aspects such as validating that all rate-transitions within the model yield deterministic results and that the appropriate rate transition blocks are being used.

Figure 5:
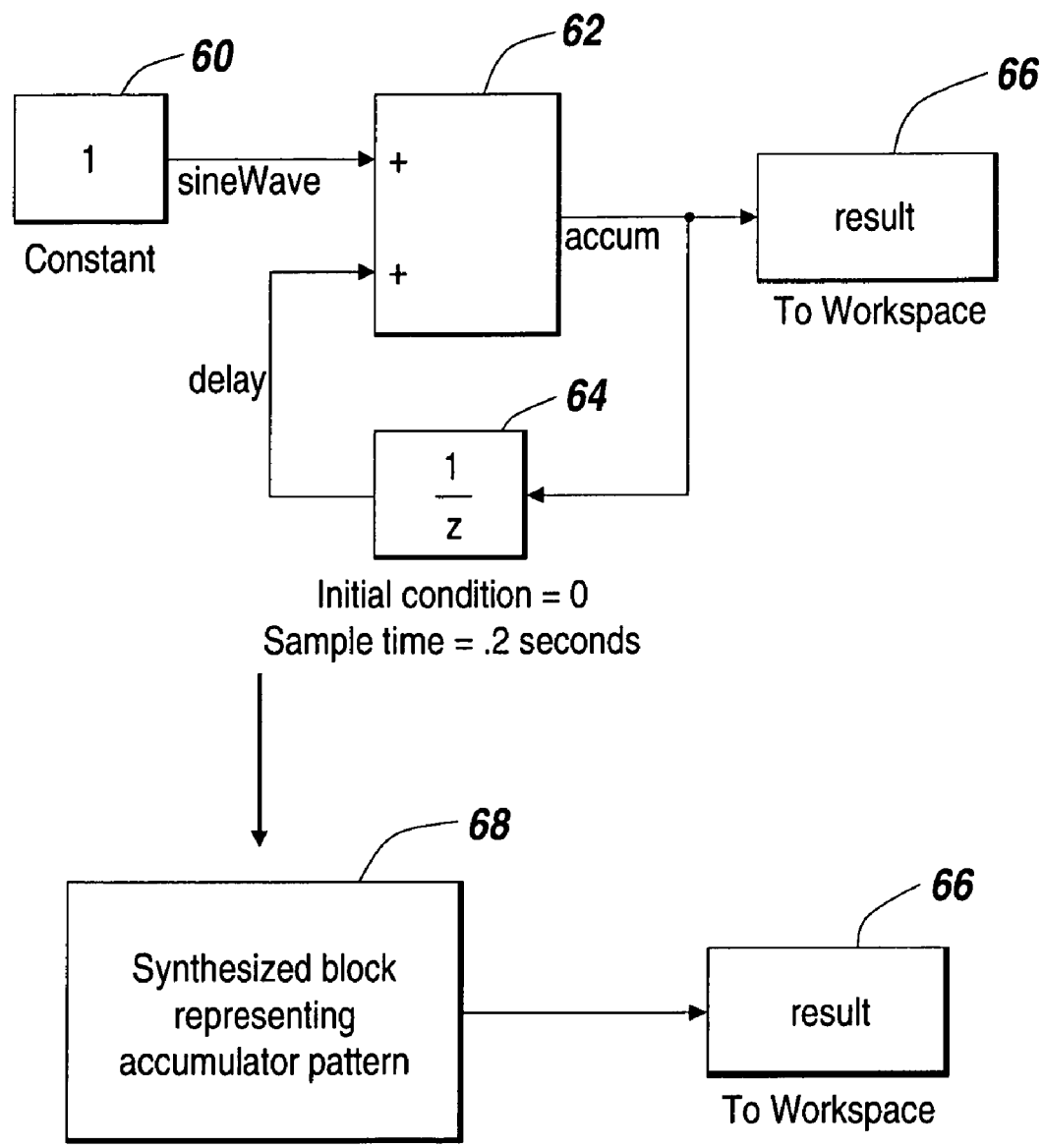
FIG. 5 depicts the replacement of a collection of blocks in a block diagram with an accumulator block.

The compilation step also determines actual block connectivity. Virtual blocks play no semantic role in the execution of a block diagram. In this step, the virtual blocks in the block diagram are optimized away (removed) and the remaining non-virtual blocks are reconnected to each other appropriately. This compiled version of the block diagram with actual block connections is used from this point forward in the execution process Once actual block connectivity has been determined (by removing the virtual blocks) the block diagram may be further optimized by performing block reduction and insertion. During this step, non-virtual blocks may be inserted or a set of non-virtual blocks may be completely removed or reduced to a single equivalent block. Block insertion and reduction is mainly done to improve execution efficiency. Examples of block insertion and reduction include the removal of Gain blocks whose gain value is 1. A Gain block is a block which multiplies its input value by a gain parameter, such as a simple amplifier. FIG. 5 depicts the replacement of a collection of blocks 60, 62, and 64 connected in an accumulator pattern and leading to result 66 with an equivalent synthesized block 68 representing the accumulator pattern leading to the same result 66. A signal copy block may also be automatically inserted in order to make contiguous memory copies of signals that are made up of disjoint memory sections. Block insertion and reduction may also be performed at other suitable stages of compilation.

The way in which blocks are interconnected in the block diagram does not necessarily define the order in which the equations (methods) corresponding to the individual blocks will be solved (executed). The actual order is partially determined during the sorting step in compilation. Once the compilation step has completed, the sorted order cannot be changed for the entire duration of the block diagram's execution.

The first step in sorting involves transforming the graphical block diagram into a compiled (in-memory) directed graph consisting of arcs and vertices. The vertices are derived from some of the non-virtual blocks. For instance, virtual and reduced blocks do not appear in the directed graph. The arcs represent data dependencies between the vertices. The data dependencies do not correspond to the signals in the block diagram. For example, all signals that connect to input ports without direct feed through are "cut" or ignored. In addition, data dependencies are added to capture implicit dependencies. For example, all inputs to a Function-Call subsystem are implicit data dependencies to the owner (caller) block.

Figure 6A:
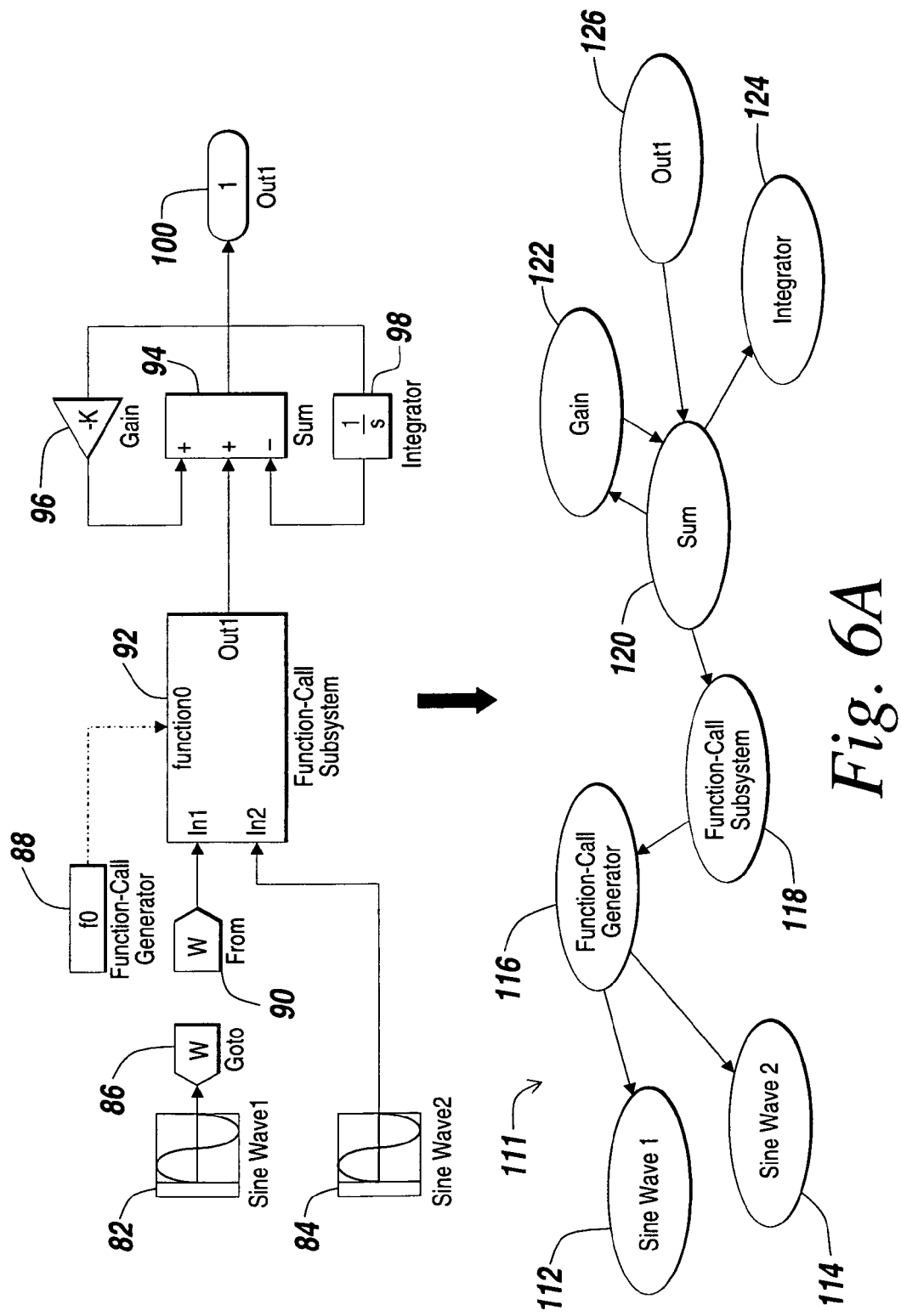
FIG. 6A depicts a block diagram and its associated directed graph.

The process of converting a block diagram into a compiled directed graph is shown in FIG. 6A. A block diagram includes a Sine Wave1 block 82, a Sine Wave2 block 84, a Goto block 86, a Function-Call Generator block 88, and a From block 90. Also included are a Function-Call Subsystem block 92, a Sum block 94, a Gain block 96, an Integrator block 98 and an Outport (Out1) block 100. Those blocks which are not virtual or reduced appear on the corresponding directed graph 111. The directed graph 111 includes a Sine Wave1 vertex 112, a Sine Wave2 vertex 114, a Function-Call Generator vertex 116, and a Function-Call Subsystem vertex 118. Also included are a Sum vertex 120, a Gain vertex 122, an Integrator vertex 124 and an Out1 vertex 126. The vertices are connected by edges.

The graph is used to sort the blocks into a linear sorted list. FIG. 6B depicts a sorted list 128 generated from the compiled directed graph 111 which includes the elements appearing as vertices in the directed graph 111 sorted into order. The root block diagram has a sorted-list associated with it. Roughly speaking, each non-virtual subsystem layer and some special block diagram elements also each have their own sorted-list. During the sorting of the graph into the list, strongly connected components are identified. The term strongly connected component, which is a term that originates from graph theory, is a subset, S, of the blocks of a block diagram such that any block in S is reachable from any other block in S by following signal connections and S is not a subset of any larger such set. Strongly connected components are flagged as algebraic loops when all blocks have direct feed through (an example is shown in FIG. 6A consisting of the Sum 120 and Gain 122 blocks). Such loops correspond to a set of algebraic equations and are solved using iterations and perturbations during block diagram execution by solving for the algebraic variables. Algebraic variables are either specified by the user via Initial Condition blocks or chosen by the execution engine 34. Solving of algebraic loops is discussed further below.

Sorting must also take into consideration other user specified dependencies between the blocks. These dependencies include the concepts of priorities and placement groups. A block priority specifies the order in which the equations associated with a block are evaluated with respect to other blocks. Placement groups are a way of causing each class of block methods for a specified set of blocks to be "placed together" in the block method execution lists. The terms "data dependency" or "data precedence" as used herein refers to the edges of the compiled directed graph and not the signals found within a block diagram. Attempting to correlate data dependencies directly to the signals found within a block diagram is incorrect and leads to the conclusion that Simulink® does not satisfy data dependencies, i.e., the execution of the operations or block methods does not satisfy data dependencies if one interprets signal connectivity as specifying data dependencies.

After compilation, the link stage commences. During this stage physical memory allocations are made in order to prepare for execution. Buffers are allocated for block input and output data buffers, states, and work areas. Additionally, block method execution lists that are derived from the sorted list allow for execution of the block diagram. Each block method execution list is a list of block methods that are to be executed in a sequence when each method within the list has a sample hit. There is generally a set of block method execution lists associated with each layer of the block diagram that corresponds to a non-virtual subsystem. Non-virtual subsystems are either defined by the user or automatically synthesized during compilation to either efficiently execute the model or simplify the implementation of the semantics defined by Simulink®. In multi-tasking mode, the lists within each layer may be further partitioned when block diagrams have blocks with different sample rates. These lists are explained in greater detail below.

Those skilled in the art will recognize that while the block method execution lists are derived from the sorted list, they do not necessarily correspond one-to-one with the sorted lists. First, each block method execution list contains only blocks that have such a block method of the given type (class) defined by the list. Second, block methods corresponding to components like the function-call subsystem do not appear on the block method execution lists because they are executed by an "owner" block.

Although included in the discussion of the compilation stage, it is not required that the time-based diagram perform the block sorting step during compilation. The sorting step is performed to achieve efficient execution. Ignoring efficiency, there is no semantic reason to perform the sorting step. Any random ordering of the block methods will work. In fact, any ordering of all block method execution lists except the Output block method execution list will result in the same level of efficiency. Randomly re-ordering the Output block method execution list will yield correct answers. If the Output block method list is randomly ordered, then the Simulation engine, when executing the Output block method execution list, continues sequencing through the Output block method execution list at each point in time until there are no changes.

Similarly included within the linking stage for the sake of simplicity, is the memory initialization of the model. The memory initialization of the model includes invoking block start, initialize, constant initialize, enable, and constant output methods. These are examples of some of the block methods that are used during model setup (prior to execution) to initialize the "state" of the system so that execution, trimming, or linearization can commence.

The compiled and linked version of the block diagram may be directly utilized to execute the model over the desired time-span. This interpretive mode of execution is suitable for getting fine-grained signal traceability. It should be noted that the traceability associated with interpretive execution comes at the price of increased overhead in the form of additional execution-related data-structures and messaging in the engine. An alternative to the interpretive execution mode is to utilize the generated-code created by the Real-Time Workshop tool for Simulink® models. In this mode, the engine (upon the behest of the user) translates a selected portion of the block diagram (or the entire block diagram itself) into code. Such code could be in a number of possible forms. The code may be instructions in a high-level software language such as C, C++, Ada, etc., hardware descriptions of the block diagram portions in a language such as HDL, or custom code formats suitable for interpretation in some third-party software. Alternatively, the code may be instructions suitable for a hardware platform such as a microprocessor, microcontroller, or digital signal processor, etc., a platform independent assembly that can be re-targeted to other environments, or just-in-time code (instructions) that corresponds to sections of the block diagram for accelerated performance.

The execution of a portion of the block diagram represented in code may be performed in a number of different ways based on the specific code format. The portion of the block diagram may execute a compiled version of the code generated in a high-level language (accelerated or software-in-the-loop simulation), the execution may simulate code that corresponds to a hardware description on a hardware simulator, (co-simulation execution), the execution may involve calling out to third-party software to run code generated for such software (co-simulation execution), or the execution may call out directly to hardware that will run code that was generated and compiled for that hardware (processor-in-the-loop execution).

There are several different advantages to execution through code generation: Execution of generated code can be more efficient than interpretive execution because of fewer data-structures and lesser internal messaging in the engine, although the increased efficiency generally comes at the cost of decreased execution traceability. Simulation of hardware descriptions during execution can help identify and resolve bugs in the software stage of a design project. Such bugs prove much more expensive to track and fix once the system has been implemented in hardware. Additionally, block diagram modeling software can be integrated with other software environments that are suitable for modeling and simulating special classes of systems. Models can be tested directly in hardware thereby making prototyping of new systems fast and cost-effective. For instance, consider the design of a controller for an anti-lock braking system of a car. The dynamics of the braking system can be executed in the interpretive mode in the block diagram. The controller itself can be implemented on a hardware micro-controller to test the efficiency of the control laws implemented within. Note that for such target execution, it is normally necessary for the time span over which a model is executed by the software to match real-world time. In other words, the software must allow real-time execution of the block diagram model. Those skilled in the art will recognize that when users generate code, they may choose to not proceed further with the block diagram's execution. They may choose to take the code and deploy it outside of the confines of the modeling software environment. This is normally the last step in the design of dynamic systems in a block diagram software package.

There are several forms of target code execution known to those skilled in the art such as Rapid Prototyping, Embedded System Deployment, and Hardware-in-the-Loop which execute a model or portions of a model via the generated code on a Real-Time System target. One aspect of deploying (executing) the generated code on a target is the notion of "external mode." External mode refers to a system where Simulink® acts as a monitor and debugger of the generated code running in real-time on a target. In External Mode, users can change parameters and view signals via standard Simulink® elements. Another important aspect of the code generation technology is that it is very extensible. Provided with the Simulink® product family is the Target Language Compiler (TLC). This technology enables the creation of "active scripts" that control how the generated code is produced for a block diagram. Using TLC, one can tailor the generated code to suit their specific needs.

The execution of the block diagram uses a Simulation Loop (SimLoop) for solving for the block diagram's outputs for a specified set of inputs over a specified span of time ("Time" in reference to the Simulation Loop means the time-line corresponding to the tracing of the dynamic system's outputs, not real-world time unless otherwise noted). The term "SimLoop" applies to real-time systems where each iteration is tied to a physical periodic clock or other timer source. During this process, the block methods (equations) corresponding to the individual blocks are executed by type following their sorted order when they have a sample hit. The term "block execution" is loosely used to mean executing all block methods associated with the given block for a given time step, generally starting with the output method. Strictly speaking, blocks do not execute; the engine executes (evaluates) the appropriate block methods at the appropriate time points.

Although blocks may be associated with more than one sample time in a sufficiently complex dynamic system, the descriptions contained herein are confined to blocks with a single sample-time. Those skilled in the art will recognize that the descriptions may be extended to encompass blocks with multiple sample times.

Figure 7A:
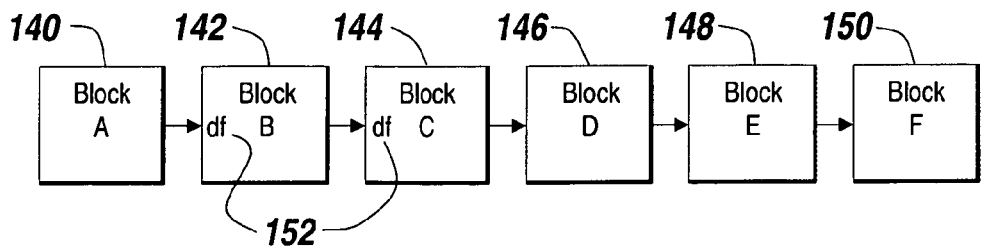
FIG. 7A depicts an abstract example of a block diagram being executed.
Figure 7B:
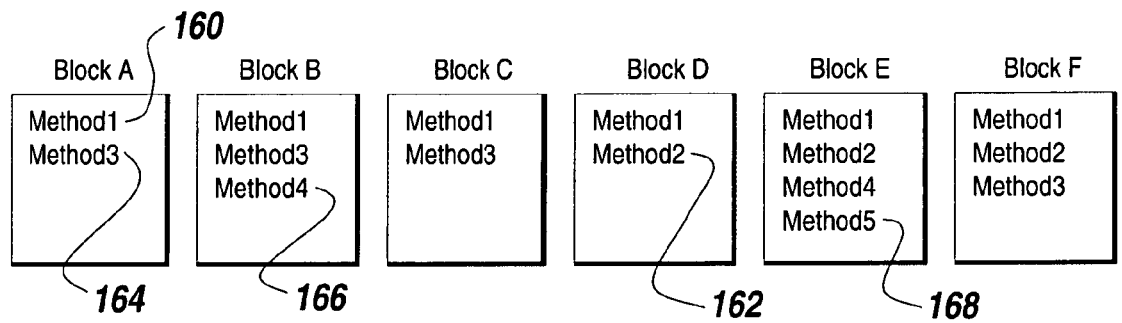
FIG. 7B depicts an abstract view of the execution methods instantiated by the blocks depicted in FIG. 7A.
Figure 7C:
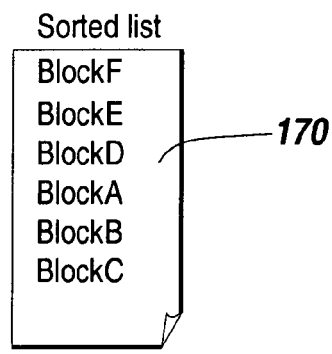
FIG. 7C depicts a sorted list generated from the data dependencies between blocks of FIG. 7A.

FIG. 7A depicts an abstract example of a block diagram being executed. The diagram includes a plurality of blocks 140, 142, 144, 146, 148 and 150. The block ports that have direct feedthrough are explicitly marked (using the symbol 'df') 152. Additionally, an abstract view of the execution methods instantiated by each block is shown in FIG. 7B. The blocks contain a number of different methods 160, 162, 164, 166 and 168. Execution methods include the three basic execution methods discussed earlier: Output, Update, Derivative, as well as several other methods that aid in advanced block functions such as initialization, linearization and zero-crossing detection, which are discussed below. The data-dependencies between the compiled vertices created during sorting are used to generate the Sorted List 170 shown in FIG. 7C.

Figure 8:
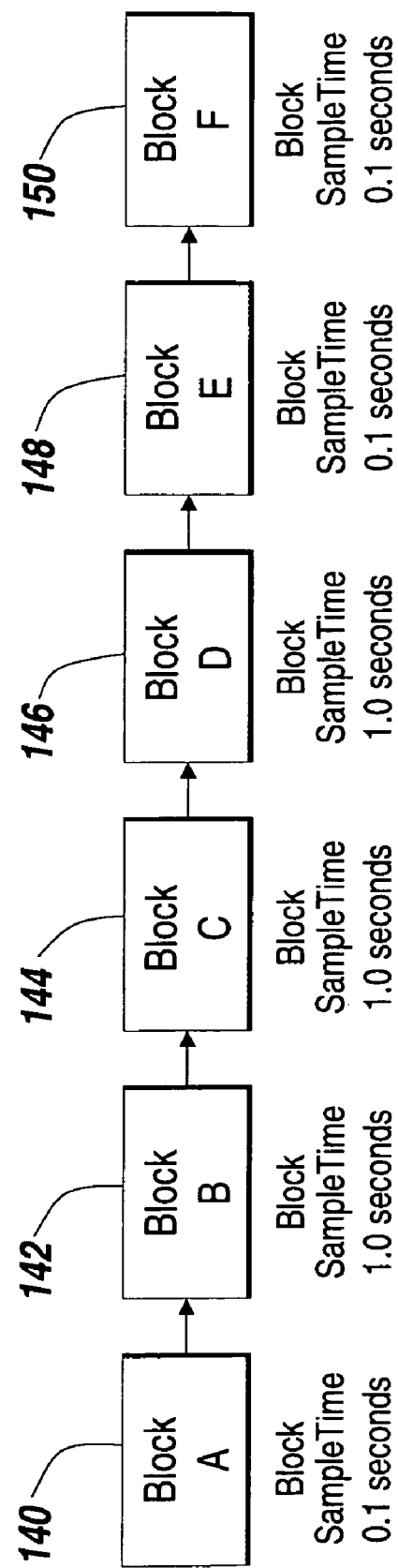
FIG. 8 depicts a multi-rate system.

A block diagram consisting of blocks that all have the same sample time is said to correspond to a single-rate system. A block diagram consisting of blocks that have more than one sample time corresponds to a multi-rate system. FIG. 8 depicts a multi-rate system, adding sample-time information to the block diagram of FIG. 7A. The plurality of blocks 140, 142, 144, 146, 148, and 150 each have an associated sample time. Since the sample times in the block diagram differ between blocks, the system is considered a multi-rate system. Block A 140, block E 148 and block F 150 each have a sample time of 0.1 seconds. Block B 142, block C 144 and block D 146 each have a sample time of 1.0 seconds.

The SimLoop is the heart of the execution engine 34. Each full pass through the loop is responsible for computing the outputs of the system at a particular time. At the end of each loop, the execution time corresponding to the next pass through the loop is computed. If this time exceeds the stop time specified by the user, the execution terminates. Within the loop, the sequence in which individual block equations are solved is determined by two pieces of information: the sample times of the blocks and the sorted order determined during the Compile stage. The amalgamation of these two pieces of information gives the execution lists for the block diagram. Those skilled in the art will recognize that the execution lists are created in the Link stage and are explained in the context of SimLoops for convenience. There are two distinct approaches for building execution lists and using them in the SimLoop. These approaches correspond to the Single-tasking and Multi-tasking SimLoops summarized in the discussion on FIG. 10 below.

Simulink® also has the ability to modify coefficients (parameters) of blocks that declare their parameters as tunable. An example of a block is a Sine Wave block that implements the function output (time)=Amplitude*sin(frequency*time+phase)+bias, where time is the independent variable and the parameters are: amplitude, frequency, phase, bias. When these parameters are declared as tunable, Simulink® lets the user change these coefficients during simulation. Changing parameters is a drastic operation in that the definition of the model has changed (e.g. the sine block defines equations that describe the system). Thus, to enable the changing of parameters during the SimLoop, Simulink® first queues parameter changes and then applies them on the next time step. Thus, the changing of parameters is not immediate. The delay in the changing of parameters is needed to ensure system stability. The application of the parameters at the start of the next time step is combined with the reset of the solver (Integrator) if needed.

Figure 9:
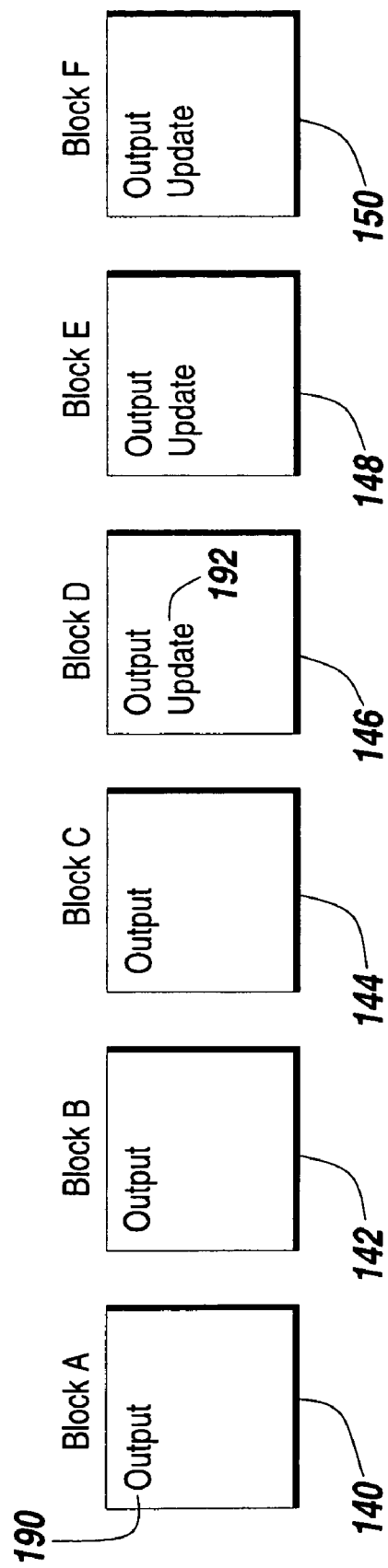
FIG. 9 depicts the block diagram of FIG. 7A and FIG. 8 with associated methods added to the blocks.

For the purpose of exploring single-task loops and multi-task loops, FIG. 9 depicts the block diagrams of FIG. 7A and FIG. 8 where Method1 corresponds to the Output method 190 and Method2 corresponds to the Update method 192. All other methods are ignored in the explanation of the loops. Simpler loops that do not include blocks that have continuous sample times are used in the example since the explanation is simpler in the context of discrete sample times and it is straight-forward to extend to continuous sample times.

Figure 10:
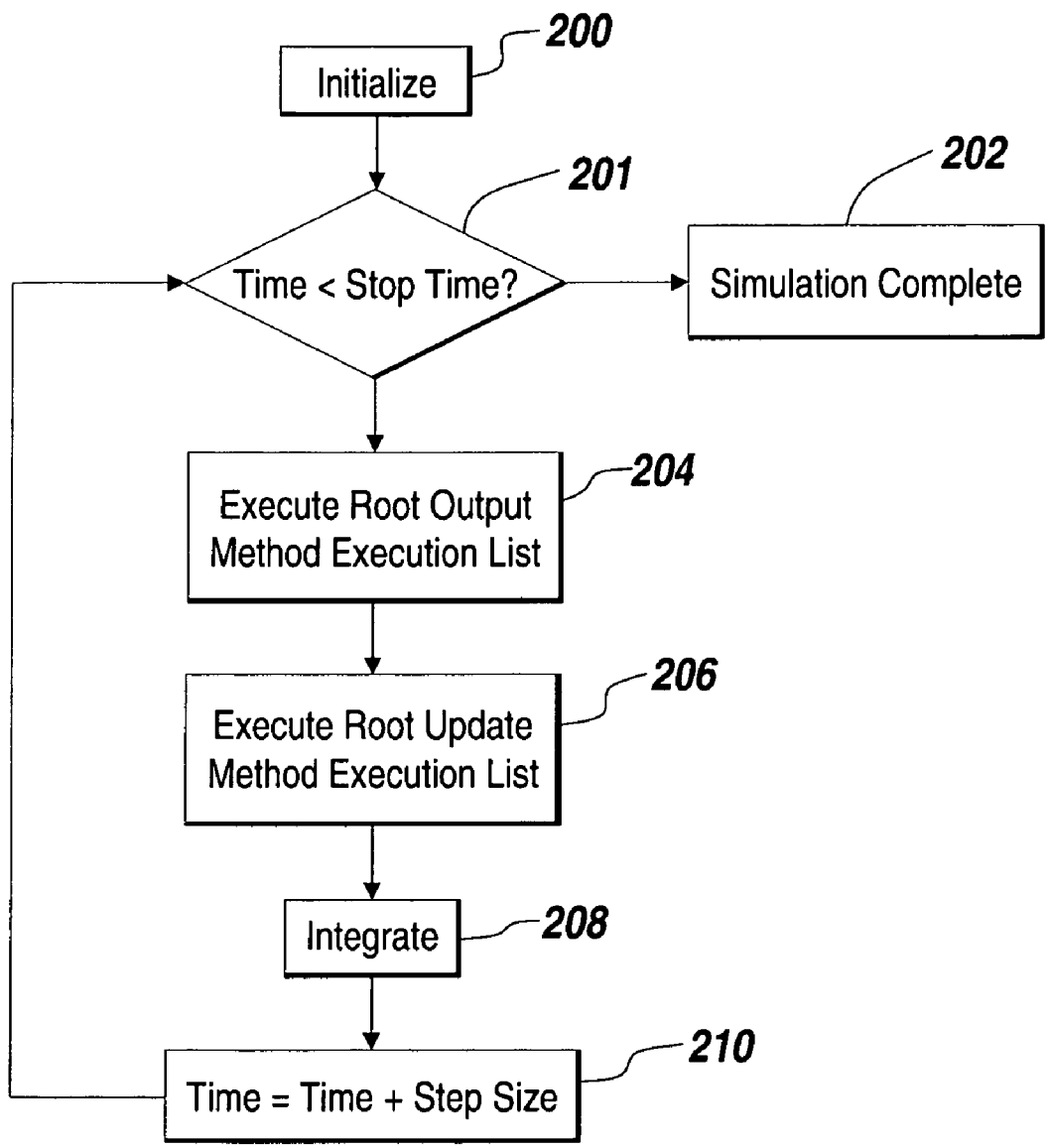
FIG. 10 is a flowchart of the sequence of steps followed by a single-tasking execution loop.

In a single-tasking SimLoop, there is essentially a single execution time-line. On this time-line, each block is executed when it has a sample hit. A sample hit is defined to be an execution time instant that is an integer multiple of the block's sample time. To aid in execution, execution lists are constructed for each method type. FIG. 10 depicts the sequence of steps followed by a single-tasking execution loop. Following initialization (step 200), a time parameter is checked to see if the current time is less than the stop time (step 201). If the time is not less than the stop time, the simulation ends (step 202). If the time is less than the stop time, the simulation continues and the root output method execution list is executed (step 204). Following execution of the output method list (step 204) the update method execution list is executed (step 206). Following the performance of an integrate step (208) (the Integrate step is described more below in FIG. 14), the time parameter is incremented by the applicable step size (step 210).

Figure 11A:
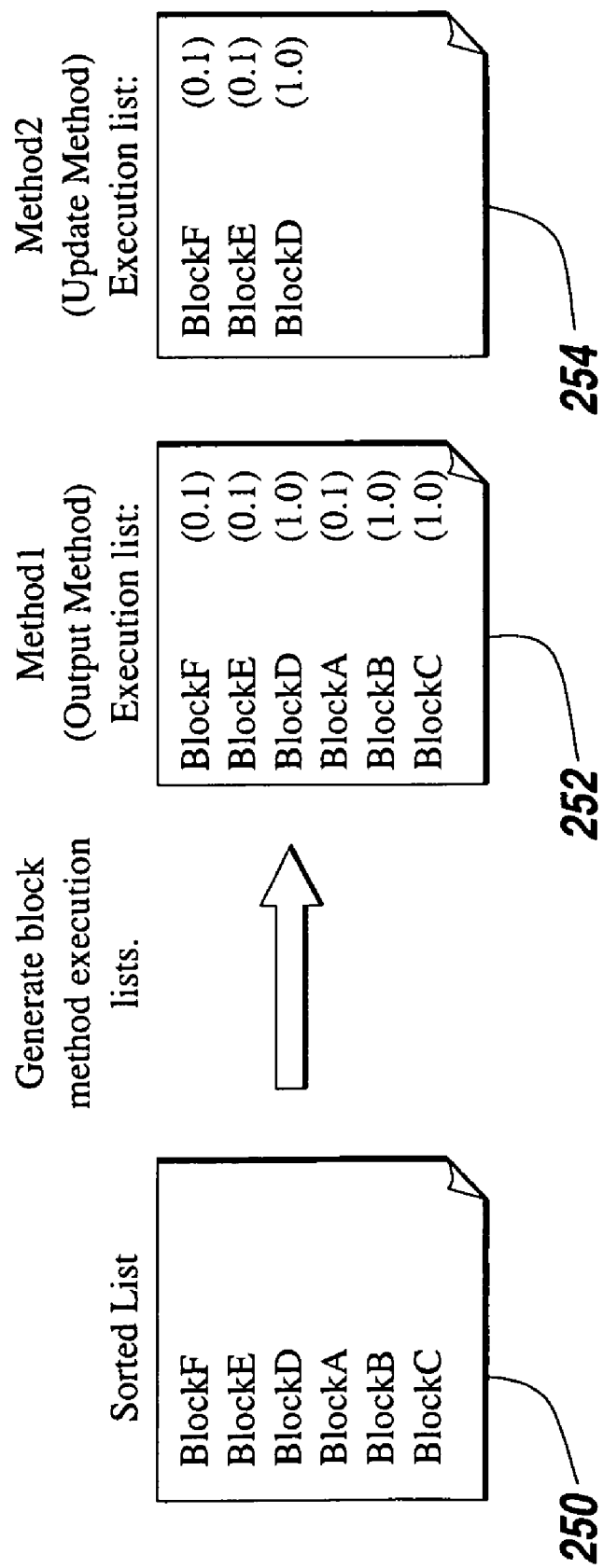
FIG. 11A depicts the creation of execution lists from sorted lists in single task mode.

Blocks are arranged in the single-tasking execution lists in the sorted order as shown in FIG. 11A. A sorted list 250 is used to generate an Output method execution list 252 and an Update method execution list 254. Referring back to the example in FIG. 7 and FIG. 8, the engine sequentially steps through and execute each block in the block method execution list when the execution time divided by the sample time equals an integer number (1, 2, 3, 4, etc.). At time zero ($T_0$), all the blocks are executed. This involves executing the Output methods for blocks F, E, D, A, B, and C (in this order as dictated by the sorted list) and then executing the Update methods of blocks F, E, and D (again, in this order based on the sorted list). The execution time is then incremented by step size, which in this case is assumed to be 0.1 seconds. Execution then commences once again at the top of the loop for T=0.1 ($T_{0.1}$). Blocks F and E have a sample time of 0.1 seconds and have a sample hit (0.1÷0.1=1, sample time is an integer multiple of the execution time), so the output block methods for Blocks F and E are executed. Block D, however, has a 1.0 second sample time and has no sample hit (0.1÷1.0=0.1, sample time is not an integer multiple of the execution time), so its output block method is not executed (essentially it is skipped). Block A, like Blocks F and E, has a 0.1 second sample time and so its output block method is executed. Blocks B and C, like Block D, have 1.0 second sample times and are skipped during this iteration of the simulation loop, which completes execution of the output block method execution list for $T_{0.1}$.

Figure 11B:
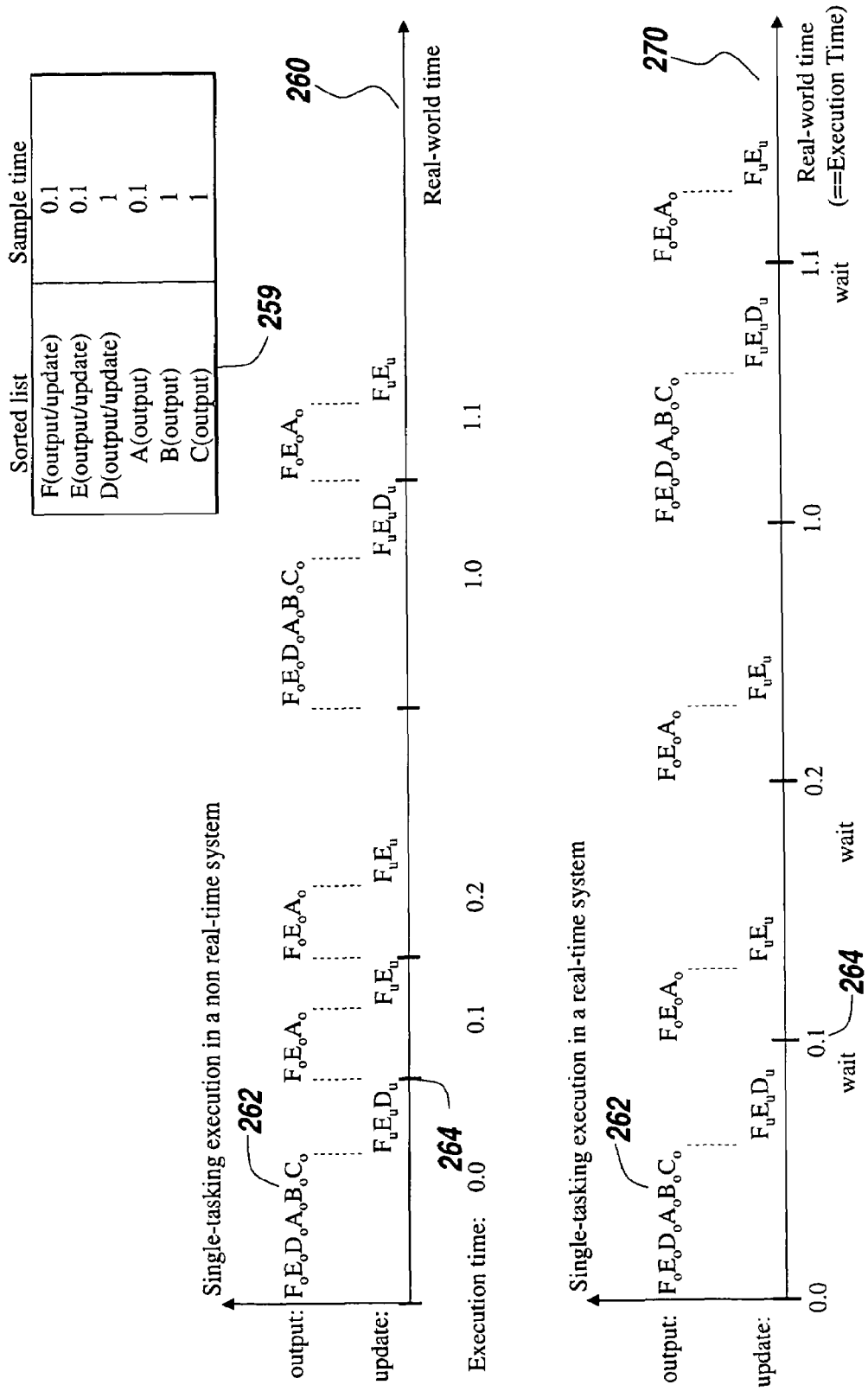
FIG. 11B depicts the execution timing of block diagrams in single task mode in timelines synchronized and non-synchronized with real world time.

The execution timing of the example block diagram in single task mode is shown in the first time-line of FIG. 11B. In this diagram, note that the execution-time is not synchronized with real-world time. Instead, execution time progresses as fast as it can in real-world time. The sorted list 259 is executed on the time-line 260. The methods in the list 262 are executed at the appropriate time step 264. Block diagram modeling software can also allow users to simulate real-world conditions by synchronizing execution time with real-world time. Such execution is illustrated in the second timing diagram of FIG. 11B. The methods 262 are implemented at a time-step 264 synchronized with real world time on the time line 270.

Figure 12A:
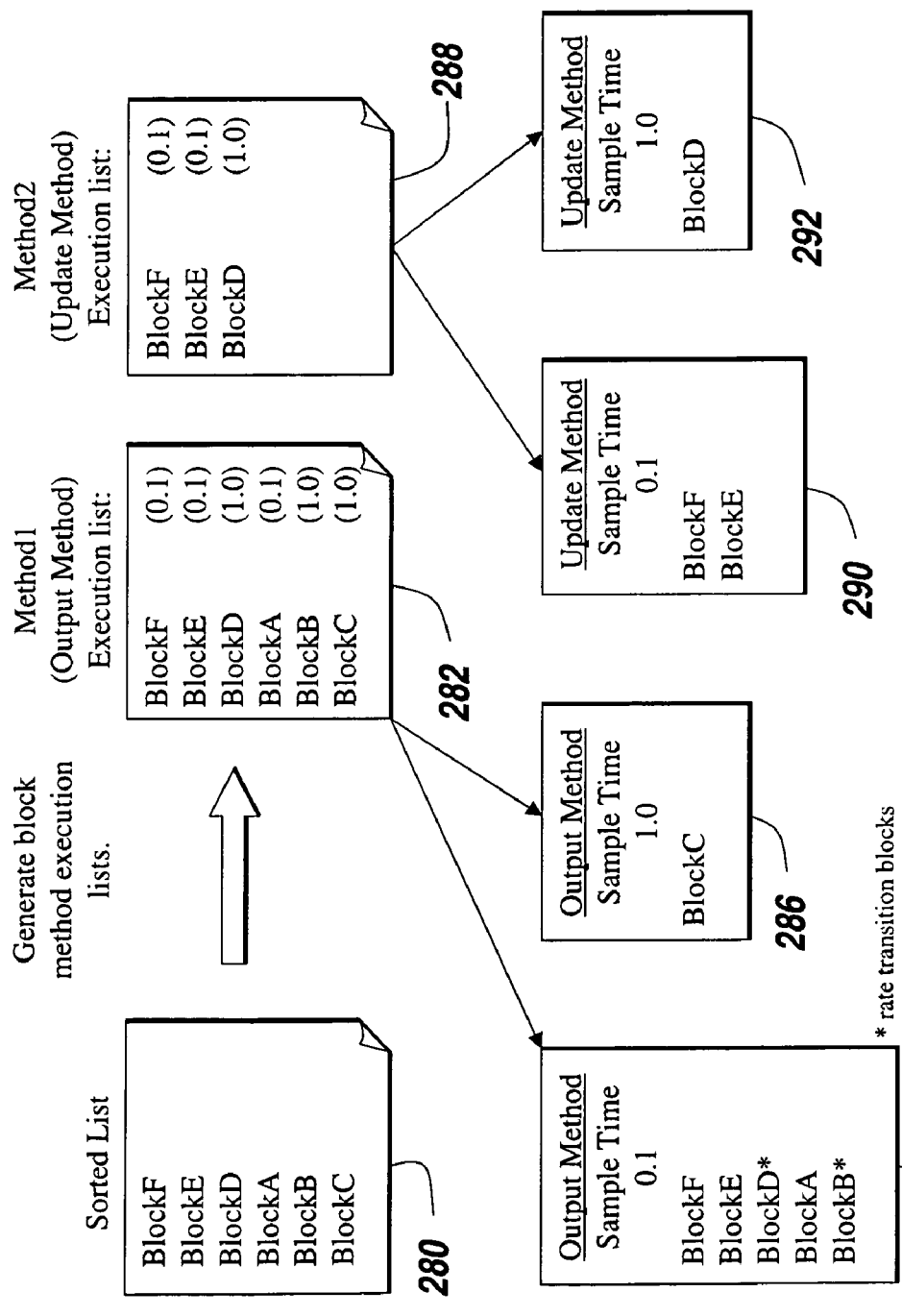
FIG. 12A depicts the creation of execution lists from sorted lists in multi-task mode.
Figure 13:
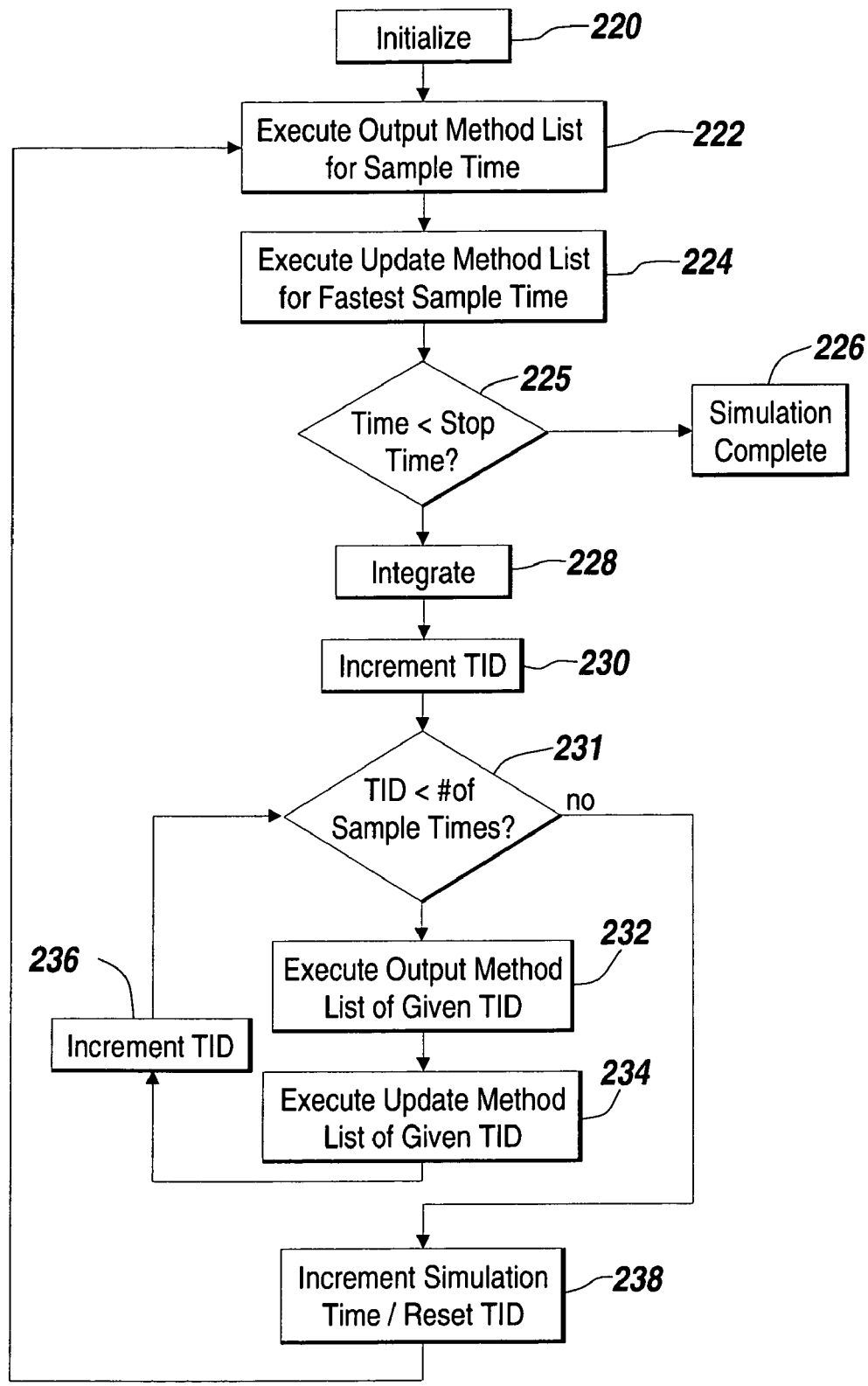
FIG. 13 is a flowchart of the overall sequence of steps taken by Simulink® in multi-task mode.

In multitask mode, the engine performs execution along multiple time-lines based upon the number of block sample times used in the mode as shown in the flowchart of FIG. 13. In the example of FIGS. 7 and 8, the model's blocks have a sample time of either 0.1 seconds or 1.0 second. This implies that the engine runs one set of blocks along a 0.1 second time line and another set of blocks along a 1.0 second time line. In order to run in multitask mode, the execution lists are first divided on the basis of methods (as in single-tasking mode) and then subdivided again based upon block sample times. This is illustrated in FIG. 12A. The sorted list 280 is used to generate an output method execution list 282 and update method execution list 288. The output method execution list 282 is split into two separate execution lists 284 and 286 based on sample times. Similarly, the update method execution list 288 is divided into two update method execution lists 290 and 292 based on sample times.

The execution engine 34 uses the divided execution lists to create multiple execution time lines. In the multitask mode the engine places a higher execution priority on the faster sample time blocks than the slower sample time blocks. This prioritization is carried out by assigning Task Identification Numbers (TIDs) to each execution list; the higher the priority, the lower the TID. For example, a TID of 0 executes at a higher priority than a TID of 1, and so forth. Furthermore, because during execution in multitask mode, execution transitions between the faster and slower blocks, and vice-versa, the multitask mode requires rate transition blocks that allow the model to transition from blocks running at fast sample times, in our example 0.1 seconds, to slower samples times, e.g., 1.0 seconds. The rate transition blocks are required to correctly simulate how a multi-rate system would behave in a real-time environment. To provide this transition, the engine promotes rate transition blocks to the TID of the fast block for which transition is being provided, although the engine executes these rate transition blocks at their slower rate. This is why Blocks D and B appear in the 0.1 sample time output method execution list in FIG. 12A.

Figure 12B:
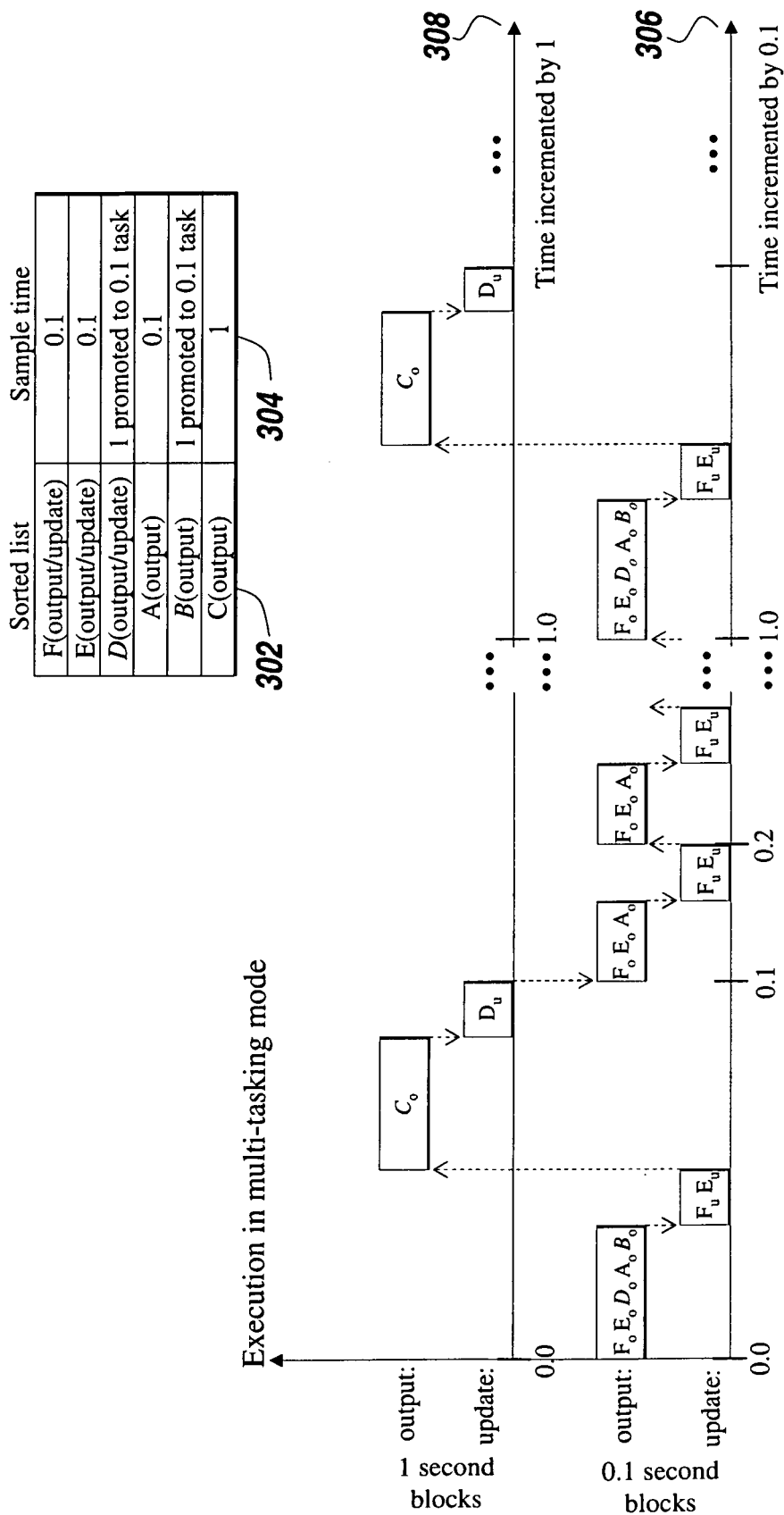
FIG. 12B depicts the execution timing of block diagrams in multi-task mode.

The execution of our example in the multi-task mode may be seen in FIG. 12B. At time T=0, the engine first executes the high priority output methods (those with TID 0) for Blocks F, E, D, A and B, then it executes the high priority update methods (those with TID 0) for Blocks F and E. After finishing the high priority blocks, the engine executes the lower priority output block methods (those with TID 1) for Block C, and then executes the lower priority update methods (those with TID 1), which, in this example, is Block D. In contrast to the single task mode, in multitask mode the engine runs through a TID inner loop to execute the output and update block methods before going on to the Integration step, as the flow chart in FIG. 13 which is discussed below illustrates.

As a result of the inner TID loop, as well as the segregated block method execution lists, the order of execution in multitask mode differs from the order of execution in single task mode. Recall for the example that in single task mode the order of execution at T=0 is: $F_o, E_o, D_o, A_o, B_o, C_o, F_u, E_u$, and $D_u$, where the subscript "o" stands for output method and the subscript "u" stands for update method. In the multitask mode, however, the order of execution at T=0 is: $F_o, E_o, D_o, A_o, B_o, F_u, E_u, C_o$, and $D_u$. Notice that $C_o$ is executed in a different order in multitasking mode. This occurs because separate method execution lists (based upon sample time) are created and run in order from fasted sample time to slowest sample time. Additionally, the use of rate transition blocks restricts the connection of blocks with different rates. By requiring the insertion of these blocks into the model, the engine ensures that execution in multitask mode will follow the sorted list.

After it has finished executing the block methods for T=0, like in the single task mode, the execution time is incremented (again assume by 0.1 seconds) and execution goes to the beginning of the loop. The engine executes $F_o, E_o, A_o, F_u$, and $E_0$, and the engine does not execute the block methods of Blocks D, B, and C because the current execution time is not an integer multiple of those block's sample time. The engine repeats this execution until the execution time is incremented to 1.0 seconds, whereupon execution occurs in the same manner as described for T=0. The engine repeats this overall process until the execution stop time is reached.

FIG. 12B shows two time-lines; the lower time-line 306 represents the execution order of the faster sample time blocks (Blocks A, E, and F), along with the rate transition blocks (Blocks B and D), while the top time-line 308 shows the execution order of the slower sample time block (Block C), and the rate transition (Block D) update method. The time-lines are generated from the sorted list 302 and the associated sample times 304. The lower line, representing the faster sample times has a TID of 0, and the top line has a TID of 1. For execution time T=0, the chart shows that the engine executes the output methods for Blocks F, E, D, A, and B (designated on the chart as $F_o, E_o, D_o, A_o, B_o$). Then, consistent with the flow chart for the multi-tasking mode (see FIG.

13 discussed below), the engine executes the update block methods for Blocks F and E (designated $F_u$, and $E_u$). Once the engine is finished with the high priority block methods, the output method for Block C ($C_o$) and the update method for rate transition block D ($D_u$) are executed. The execution time is then incremented by the step size (continue to assume 0.1 seconds) and the blocks that have a sample hit are executed. The figure shows execution of $F_o$, $E_o$, $A_o$, $F_u$ and $E_u$, which is repeated, as noted above, until execution time equals 1.0 second. Notice, like in the non-real-time case for Single-task mode, the engine does not wait for time to elapse; rather it executes block methods immediately upon completion of the previous pass through the loop.

FIG. 13 shows the overall sequence of steps taken by Simulink® in multitask mode. Following the initialization (step 220), the output method execution list is executed for the fastest sample time (step 222). The update method execution list is then executed for the fastest sample time (step 224). Next, the integrate stage (step 228) is performed. The task ID variable is incremented (step 230) and compared to a parameter of the number of sample times (step 231). If the task ID is less than the number of sample times and the task has a time hit, the output method execution list for the methods assigned the new task ID are executed (step 232) followed by the execution of the update method execution list assigned the new task ID (step 234). In a threaded environment, each task is run using preemptive priority based execution. The task ID variable is incremented (step 236) and the process iterates with the task ID being compared to the number of sample rate times (step 231). After executing all tasks, individual task times are incremented, the task ID counter is reset and task ID hits are calculated (step 238). A time parameter is checked (step 225) to determine if the time is less than a designated stop time. If the stop time has been reached, the simulation completes (step 226). Otherwise the entire process iterates with the output method list execution list (step 222) being executed for the fastest sample time. The process continues until the end of simulation when the time equals the stop time (step 226).

In order to understand how the step size is picked within SimLoop, it is first necessary to understand the notion of a solver. The solver is a module of the execution engine 34 that is responsible for performing two tasks: (a) determining how far execution time should be advanced between consecutive passes through the SimLoop in order to accurately trace the system's outputs, and (b) integrating the derivative of the states of the system to obtain the actual states. Based on how solvers perform the first task, they are generally classified into two basic classes: Fixed-step solvers or Variable-step solvers.

Fixed-step solvers are solvers in which the time step-size between consecutive passes through the SimLoop is a fixed quantity. The user generally explicitly specifies this quantity. These solvers are used to model types of systems that must operate within a defined time (discrete systems). For instance, an anti-lock braking system may be designed to control a car's braking system, and to execute such control in one hundredth (0.01) of a second so as to assure the car stops safely; if the braking system does not meet its timing constraints, the car may crash. Fixed-step solvers, therefore, are designed to help model discrete systems that have to generate a result in a fixed time period, and the fixed-step execution assures that the modeled system can generate such results.

Variable-step solvers are designed to model continuous systems where non-evenly spaced time steps are needed to simulate all significant behavior. For example, one may want to simulate the path of a bouncing ball, where it bounces, how high it bounces, and where it stops. It is known, based on experience, that the ball's bounces will not be evenly spaced, and that the height of the bounces will diminish as a result of gravity, friction, and other forces. Variable-step solvers are used for these types of continuous systems and to determine what step size to use so that the behavior of the ball will be accurately modeled.

The two broad classes of solvers are further subdivided based on the integration task they perform. There are several algorithms for carrying out numerical integration. The particular choice of the integration algorithm gives rise to the subclasses of solvers.

Figure 14:
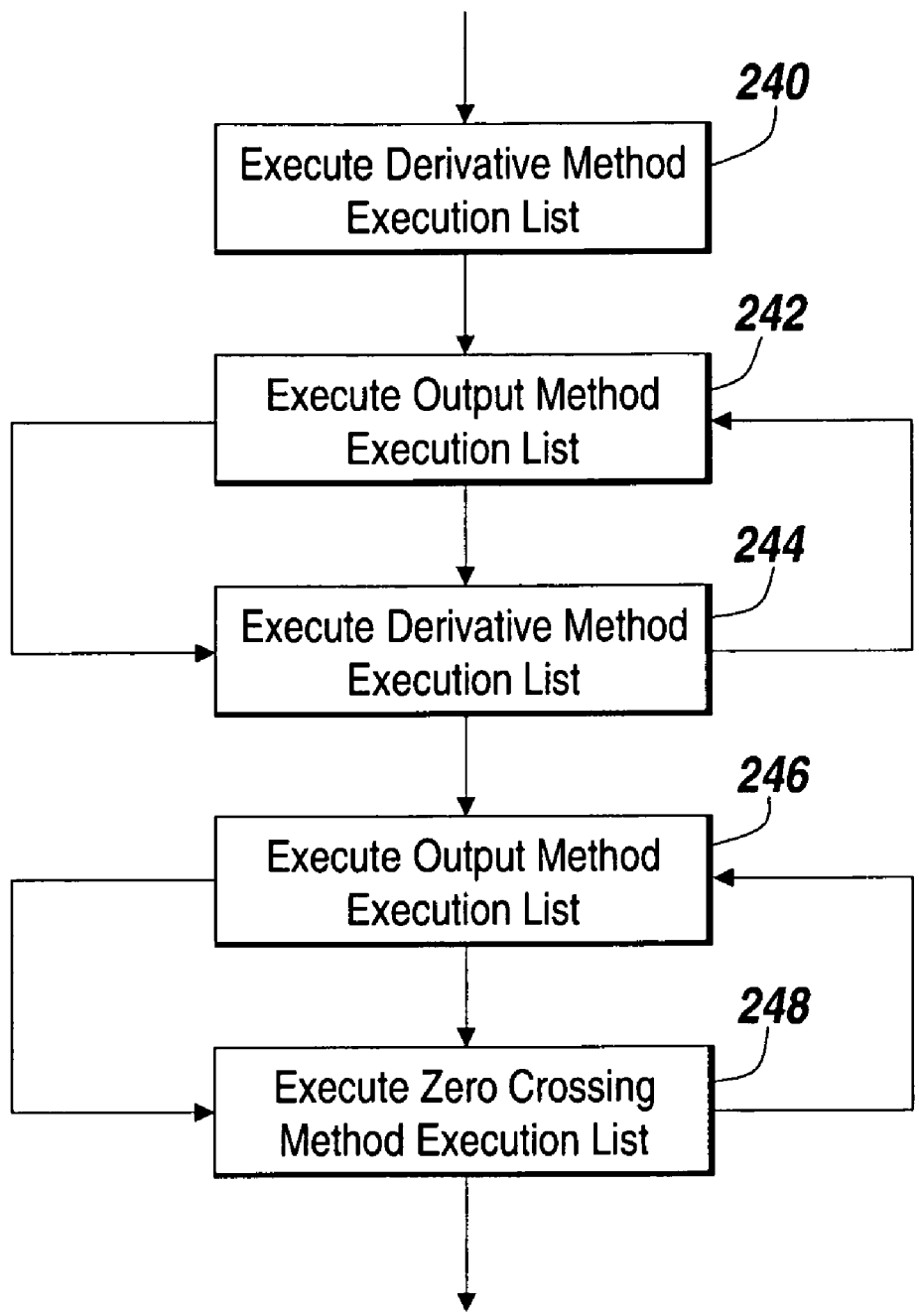
FIG. 14 is a flowchart of the sequence of steps followed by a variable-step solver.

The difference in the conceptual definition of Fixed- and Variable-step solvers leads to the functional difference in the context of the SimLoop. The major difference between the solvers arises in the Integrate step of the SimLoop which is depicted in FIG. 14. During the Integrate step, the Variable-step solver executes the Output and Derivative block method lists for a number of iterations that varies based on the solver subclass (i.e., the numerical integration algorithm it uses) and integration error tolerances. In a fixed-step solver, the number of iterations is fixed for a given solver subclass. Another difference between solvers arises in the Integrate phase in the context of an operation known as zero-crossing detection. Zero-crossings indicate a discontinuity in the system behavior. Because discontinuities often indicate a significant change in a dynamic system, it is important to trace the system outputs precisely at such points. Otherwise, the outputs of the model could lead to false conclusions about the behavior of the system under investigation. Consider, again the example of the bouncing ball. If the point at which the ball hits the floor occurs between simulation steps, the simulated ball appears to reverse position in midair. This might lead an investigator to false conclusions about the physics of the bouncing ball. To avoid such misleading conclusions, it is important that the execution has time steps on and around the vicinity of discontinuities.

An example of the variable-step solver is shown in FIG. 14, the derivative method execution list is executed (step 240) followed by the output method execution list (step 242). The derivative method execution list is then executed again (step 244) and the solver iterates between the execution of the output method execution list (step 242) and the execution of the derivative method execution list (step 244). A similar iteration loop then occurs between the execution of the output method execution list (step 246) and the execution of the zero-crossing method execution list (step 248). Note that Simulink® also includes other methods such as Projections and Jacobians in this step as needed.

While it is theoretically possible to have Variable-step solvers in the context of multitasking, such a combination is not employed in practice. This is because the step-size for such solvers can become very small making it impossible to keep up with the real-time constraint that generally goes along with multitasking execution. An added complication is that the integration step in such solvers is iterative and takes varying amounts of time at each step of the execution. Therefore, Variable-step solvers are generally used only in conjunction with the Single-Tasking SimLoop. Additionally, they are not usually employed in systems that need to operate in real-time.

When a model contains an algebraic loop, the engine calls a loop solving routine at each time step. The loop solver performs iterations and perturbations to determine the solution to the algebraic condition (if it can). One possible approach to solving the algebraic equation $F(z)=0$, is to use Newton's method with weak line search and rank-one updates to a Jacobian matrix of partial derivatives. Although the method is robust, it is possible to create loops for which the loop solver will not converge without a good initial guess for the algebraic states z. Special blocks are generally provided to specify an initial guess of the states in the algebraic loop solver.

In addition to the various forms of the SimLoop, modeling packages such as Simulink® use the output of the Link stage to compute linear models through a process generally referred to as model linearization. These linear models may be used in the SimLoop at various points in the execution of the overall model. Alternatively, the linear model may be returned to the user. The linearization process involves the use of a Jacobian method defined on blocks and numerical Jacobian algorithm.

Trimming can find constant values for an operating point of a system. Trimming finds solutions for inputs, outputs, states, and state derivatives satisfying conditions specified by a user. For example, the user can seek steady-state solutions where some or all of the derivatives of a system's states are zero. Trimming can also find specific nonequilibrium points, that is, points at which the system's state derivatives have some specified nonzero value.

Information related to the compiled block diagram may be presented to users in an automatically generated report. This report allows users to quickly obtain documentation of the functional description of their model. Information related to the execution of a particular model (such at the time taken to execute various portions of the model and the coverage of various portions of the model) may be obtained automatically and presented to the user as a report.

Analysis Tool

The illustrative embodiment of the present invention provides an analysis tool that can be used in connection with the block diagram environment. As described above, the analysis tool may be implemented separately from the block diagram environment or incorporated into the block diagram environment. Also, the block diagram environment and the analysis tool can be provided on the same computing device, or coupled to each other via a communication network.

Figure 15:
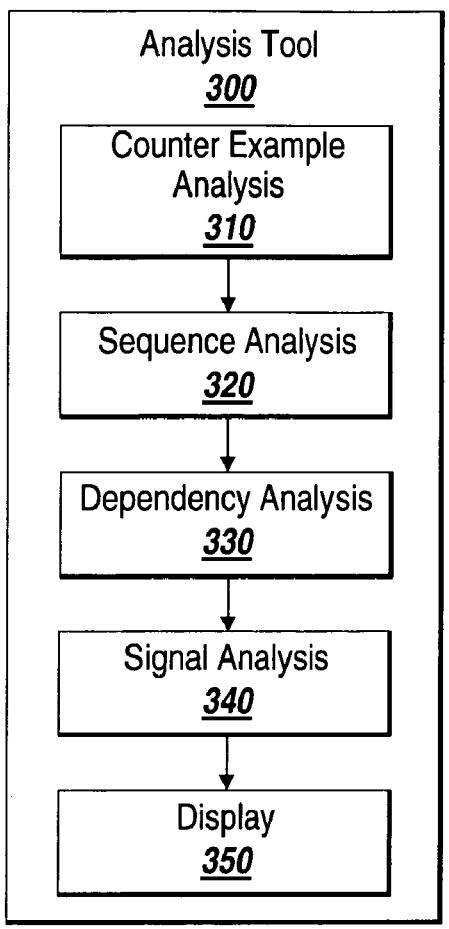
FIG. 15 depicts an exemplary analysis tool provided in the illustrative embodiment of the present invention.

FIG. 15 is an exemplary analysis tool 300 provided in the illustrative embodiment. The analysis tool 300 receives execution results data of the block diagram from the block diagram environment 30. The analysis tool 300 may include various units to analyze the execution results data of the block diagram. For example, the analysis tool 300 may include a unit 310 for analyzing counterexamples that contribute to the failure condition of the block diagram, a unit 320 for analyzing state and transition sequences, a unit 330 for analyzing data dependencies and a unit 340 for analyzing the characteristics of signals in the block diagram. The analysis tool 300 may also include a unit 350 for annotating and coloring the elements of the block diagram to display information on the execution result of the block diagram based on the analysis by the analysis units 310-340. One of ordinary skill in the art will appreciate that these units are illustrative and the analysis tool 300 may include other units that perform different functions depending upon the purpose of the analysis of the block diagram execution data. Each unit of the analysis tool 300 will be described below in more detail with reference to FIG. 16.

Figure 16:
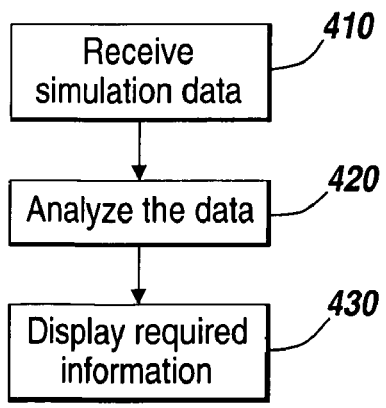
FIG. 16 is a flowchart showing an exemplary operation of the analysis tool in the illustrative embodiment.

FIG. 16 is a flow chart showing an exemplary operation of the analysis tool 300. The analysis tool 300 receives execution results data from the block diagram environment 30 (step 410). The simulation or execution results data may include the input, output and state data of each block at each sample time. The simulation or execution results data may also include the characteristics of the signals in the block diagram, such as the values, data types and dimensions of the signals. One of skill in the art will appreciate that the execution results data is not limited to the above described data, and can include any other data used in the execution of the block diagram or produced by the execution of the block diagram. For example, in the state-based and flow diagram, the execution results data may include the sequence of states and transitions during the execution of the diagram. The execution data can come in as a continuous stream as well as in several batches, or even one batch at the end of the execution. The execution data may even come from different sources at different rates, and has to be synchronized.

The analysis tool 300 then examines the simulation or execution results data received from the block diagram environment 30 (step 420). If the counterexample analysis is requested, the counterexample analysis unit 310 identifies the counterexamples of the block diagram based on the execution results data received from the block diagram environment 30. A counterexample generally refers to an example that disapproves a proposition or theory. The counterexample is an exception to a proposed general rule, i.e., a specific instance of the falsity of a universal quantification. In the illustrative embodiment, the counterexample is used to represent a portion of the block diagram that contributes to the failure condition occurred in the execution of the block diagram. Required information is displayed (step 430).

Figure 17:
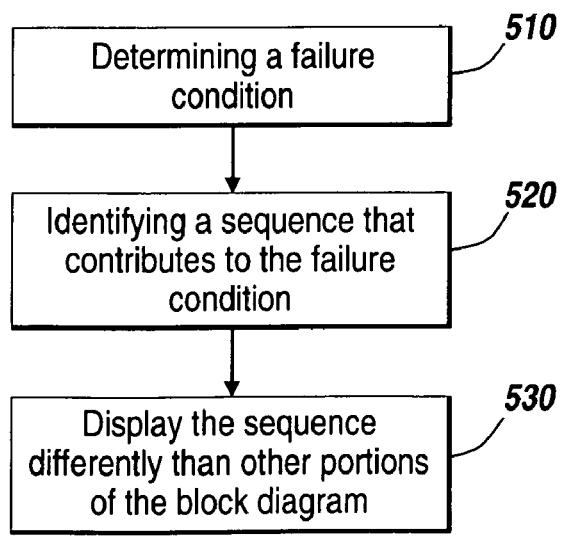
FIG. 17 is a flowchart showing an exemplary operation for identifying and displaying counterexamples in the illustrative embodiment.
Figure 18:
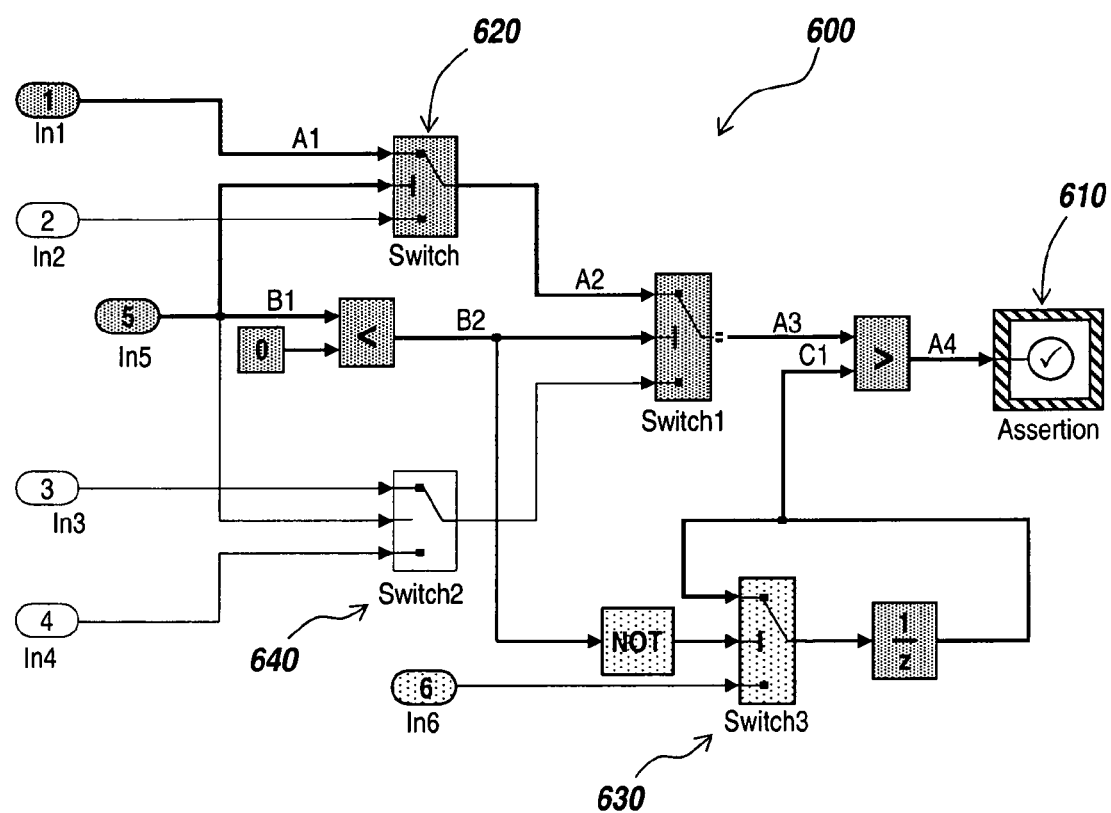
FIG. 18 shows an exemplary display of the block diagram in the illustrative embodiment.

FIG. 17 is a flow chart showing an exemplary operation for identifying and displaying counterexamples in the block diagram. Within the tool environment, the failure condition may be determined by the value of some piece of data that can be represented by any combination of graphical signal, textual label or other representation (step 510). The failure condition can occur from the result of a particular sequence of computations that depend on specific design inputs. FIG. 18 is an exemplary display showing the counterexamples of the block diagram. The block diagram 600 includes an Assertion block for determining a failure condition of the block diagram 600. The Assertion block 610 checks whether any of the elements of the signal at its input is nonzero. If any element is nonzero, the block does nothing. If any element is zero, the block halts the simulation, by default, and displays an error message. The Assertion block 610 is illustrative and one of skill in the art will appreciate that any other elements can be used to determine the failure condition in other embodiments. For example, model verification blocks can be used to determine a failure condition by testing that signals do not exceed specified limits during execution.

Referring back to FIG. 17, the analysis unit 310 isolates execution patterns of the block diagram that lead to the undesirable or unintended failure condition (step 520). By analyzing the execution results data, for example, the values of the signals in the block diagram, a representative sequence that leads to a failure conditions can be discovered. Once a pattern has been discovered, the illustrative embodiment annotates and/or colors the elements of the block diagram to provide information on the failure condition and the various data and events that preceded the failure condition in the context of the block diagram design (step 530). A user can interpret the failure condition in the context of the design to make changes that either correct the failure or redefine the failure condition so that it no longer occurs.

As depicted in FIG. 18, the analysis tool may display the counterexamples (indicated by 620 and 630) that contribute to the failure condition differently than the other elements or portions (indicated by 640) of the block diagram that do not affect the failure condition. As an example, the signals and computation elements 620 and 630 that contribute to the failure condition may be highlighted and the remaining elements 640 that do not affect the failure condition may remain in gray. Also, the intensity of colors and/or outlines can be changed to indicate the counterexamples 630 whose values and computations at earlier sample times contribute to the failure condition differently than the counterexamples 620 whose values and computations at current sample times contribute to the failure condition. For example, the counterexamples whose values and computations at earlier sample times contribute to the failure condition can be colored lighter.

The illustrative embodiment may display the characteristics of the signals in the block diagram (e.g., A1-A4, B1-B2, C1, . . . ). When the analysis tool 300 receives the execution results data from the block diagram environment 30, the signal analysis unit may identify the characteristics of the signals used and/or generated during the execution of the block diagram. The characteristics of signals can be identified by the properties of signals in the block diagram. The properties of signals may include the data types, values, units, dimensions, etc. of the signals. The data type of a signal may show whether the signal is a built-in data type signal, such as uint8, or a custom data type signal specified by a user. The dimension of a signal shows whether the signal is a scalar signal, a vector signal of size N, or an M×N matrix signal. One of skill in the art will appreciate that these characteristics of signals are illustrative and the present invention can identify other characteristics of signals, such as the complexity and sample time of the signals. The analysis unit 340 subsequently enables the display unit 350 to display the identified characteristics of the signals in the block diagram 600. In an embodiment, the user may be provided with a user interface (UI) for selecting a characteristic of signals to be displayed in the block diagram.

The illustrative embodiment may display an execution sequence in the block diagram. For example, with a state-based and flow diagram, such as those found within Stateflow® from The MathWorks, Inc. of Natick, Mass., the sequence analysis unit 320 may analyze the execution result data to identify the sequence of states and the transitions between the states during the execution of the state-based and flow diagram. Stateflow® is a graphical design and development tool that works with Simulink®. In Simulink®, a Stateflow® block uses a Stateflow® diagram to represent an object with a discrete set of modes. These modes are known as states. The Stateflow® diagram reacts to events by changing states for the controlled object. The behavior of the object depends on what state the object is in and how the object changes from one state to another. When the Stateflow® diagram is executed, the transitions between states occur. The transitions originate with a source state and terminate with a destination state. If the source state is active and the transition is taken, the source state becomes inactive and the destination state becomes active. The execution result data form the block diagram environment 30 includes information on the states and the transitions between the states in the state-based and flow diagram. When the analysis tool 300 receives the execution result data form the block diagram environment 30, the sequence analysis unit 320 identifies the transitions between the states during the execution of the state-based and flow diagram. The sequence analysis unit 320 may enable the display unit 350 to display the transitions in the state-based and flow diagram.

Figure 19:
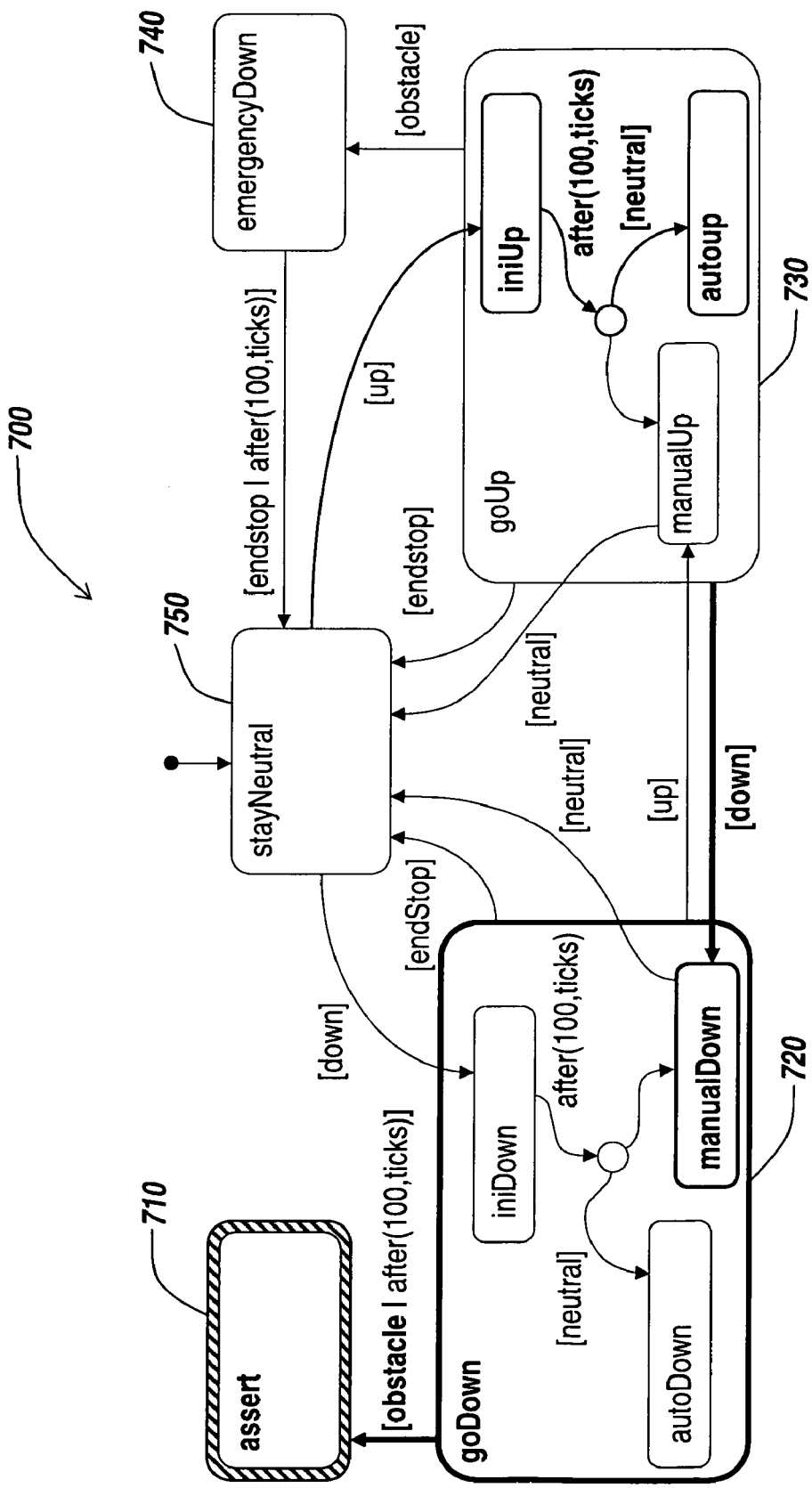
FIG. 19 shows an exemplary display of a state-based and flow diagram in the illustrative embodiment.

FIG. 19 is an exemplary display showing the transition in the state-based and flow diagram 700. The state-based and flow diagram 700 includes assert state 710, goDown state 720, goUp state 730, emergencyDown state 740 and neutralDown state 750. A state may include sub-states. The transitions between states caused by events are depicted by an arrow. The diagram 700 displays characteristics of the events and conditions by highlighting which event and condition causes a transition to be taken. Also, the diagram 700 may display a predication of a transition based upon the condition of an event that causes the transition. The transitions can be displayed using shading increments within the state-based and flow diagram 700. The illustrative embodiment may also display the characteristics of the event signals that trigger the transitions between the states in the state-based and flow diagram, including the propagation of the event signals during the execution of the state-based and flow diagram.

The illustrative embodiment may provide annotations and other graphical affordances to display data dependencies between blocks on a data item. The data dependencies can be determined in the compilation stage of the block diagram. Information on the data dependencies can be included in a compiled (in-memory) directed graph consisting of arcs and vertices described above with referenced to FIG. 6A. The arcs represent data dependencies between the vertices. The data dependencies do not correspond to the signals in the block diagram. The data dependencies may include implicit dependencies. A user can specify dependencies between the blocks. The execution result data from the block diagram environment 30 includes information on the compilation of the block diagram. When the analysis tool 300 receives the execution result data from the block diagram environment 30, the dependency analysis unit 330 identifies information on the data dependencies between blocks in the block diagram. The dependency analysis unit 330 may enable the display unit 350 to display the data dependencies in the block diagram. The display unit 350 displays the data dependencies between blocks on a single data item or multiple data items.

Since certain changes may be made without departing from the scope of the present invention, it is intended that all matter contained in the above description or shown in the accompanying drawings be interpreted as illustrative and not in a literal sense. For example, the illustrative embodiment of the present invention may be practiced in any graphical modeling environments. Practitioners of the art will realize that the sequence of steps and architectures depicted in the figures may be altered without departing from the scope of the present invention and that the illustrations contained herein are singular examples of a multitude of possible depictions of the present invention.

What is claimed is:

1. A method comprising:
analyzing, using a computational device, execution results of a model to identify an execution sequence of the model, the execution results including execution results from a plurality of sample times, the execution sequence leading to a failure condition of the model;
identifying, using the computational device, a portion of the model that contributes to the failure condition based on the identified execution sequence; and
displaying, using the computational device, the identified portion of the model differently than other portions of the model that do not contribute to the failure condition of the model.

2. The method of claim 1, further comprising:
determining, using the computational device, a cause of the failure condition of the model.

3. The method of claim 2, wherein the failure condition is determined by values of signals in the model.

4. The method of claim 1, wherein the failure condition is modeled as an assertion.

5. The method of claim 1, wherein displaying further comprises:

displaying, using the computational device, a first portion of the model that contributes to the failure condition of the model at a first sample time differently than a second portion of the model that contributes to the failure condition of the model at a second sample time.

6. The method of claim 1, wherein displaying further comprises:
displaying, using the computational device, a sequence of states and transitions using shading increments in a state and flow diagram.

7. The method of claim 1, wherein displaying further comprises:
differently displaying, using the computational device, at least one of conditions and events that preceded the failure condition.

8. The method of claim 1, wherein displaying further comprises:
annotating, using the computational device, the portion of the model to describe transient or persistent dependence upon an input data to the model.

9. The method of claim 1, wherein displaying further comprises:
displaying, using the computational device, characteristics of signals in the model.

10. The method of claim 1, wherein displaying further comprises:
displaying, using the computational device, a propagation of events in the model.

11. A system comprising:
a processor for:
analyzing execution results of a model to identify an execution sequence of the model, the execution results including execution results from a plurality of sample times, the execution sequence leading to a failure condition of the model, and
identifying a portion of the model that contributes to the failure condition based on the identified execution sequence; and
a display device for displaying the identified portion of the model differently than other portions of the model that do not contribute to the failure condition of the model.

12. The system of claim 11, wherein the processor further determines the failure condition of the model.

13. The system of claim 12, wherein the processor further determines the failure condition based on values of signals in the model.

14. The system of claim 11, wherein the processor further determines the failure condition based on a modeled assertion.

15. The system of claim 11, wherein the display device further displays a first portion of the model that contributes to the failure condition of the model at a first sample time differently than a second portion of the model that contributes to the failure condition of the model at a second sample time.

16. The system of claim 11, wherein the display device further displays a sequence of states and transitions using shading increments in a state and flow diagram.

17. The system of claim 11, wherein the display device further displays differently at least one of conditions and events that preceded the failure condition.

18. The system of claim 11, wherein the display device further displays an annotation to describe transient or persistent dependence of the portion of the model upon an input data to the model.

19. The system of claim 11, wherein the display device further displays characteristics of signals in the model.

20. The system of claim 11, wherein the display device further displays a propagation of event signals in the model.

21. A storage medium for holding instructions executed in a computer, the medium holding one or more instructions for:
analyzing execution results of a model to identify an execution sequence in the model, the execution results including execution results from a plurality of sample times, the execution sequence leading to a failure condition of the model;
identifying a portion of the model that contributes to the failure condition based on the identified execution sequence; and
displaying the identified portion of the model differently than other portions of the model that do not contribute to the failure condition of the model.

22. The medium of claim 21, further holding one or more instructions for:
determining the failure condition of the model.

23. The medium of claim 22, wherein the failure condition is determined by values of signals in the model.

24. The medium of claim 21, wherein the failure condition is determined based on modeled assertions.

25. The medium of claim 21, wherein displaying further comprises:
displaying a first portion of the model that contributes to the failure condition of the model at a first sample time differently than a second portion of the model that contributes to the failure condition of the model at a second sample time.

26. The medium of claim 21, wherein displaying further comprises:
displaying a sequence of states and transitions using shading increments in a state and flow diagram.

27. The medium of claim 21, wherein displaying further comprises:
displaying differently at least one of conditions and events that precede the failure condition.

28. The medium of claim 21, wherein displaying further comprises:
annotating the portion of the model to describe transient or persistent dependence upon an input data to the model.

29. The medium of claim 21, wherein displaying further comprises:
displaying characteristics of signals in the model.

30. The medium of claim 21, wherein displaying further comprises:
displaying a propagation of event signals in the model.

31. A method comprising:
analyzing execution results of a model to determine a counterexample of the model that contributes to a failure condition of the model using a computational device, the execution results including execution results from a plurality of sample times, the counterexample of the model being determined from one or more execution sequences of the model, identified from the execution results, that lead to the failure condition; and
displaying the counterexample of the model differently than other portions of the model that do not contribute to the failure condition of the model using the computational device.

* * * * *